United States Patent
Beemer

(10) Patent No.: US 12,149,516 B2
(45) Date of Patent: Nov. 19, 2024

(54) SYSTEM AND METHODS FOR TOKENIZED HIERARCHICAL SECURED ASSET DISTRIBUTION

(71) Applicant: FLEX Integration LLC, Washington, DC (US)

(72) Inventor: David Lee Beemer, Washington, DC (US)

(73) Assignee: Flex Integration, LLC, Virginia Beach, VA (US)

( * ) Notice: Subject to any disclaimer, the term of this patent is extended or adjusted under 35 U.S.C. 154(b) by 0 days.

(21) Appl. No.: 17/336,953

(22) Filed: Jun. 2, 2021

(65) Prior Publication Data
US 2021/0377240 A1    Dec. 2, 2021

Related U.S. Application Data

(60) Provisional application No. 63/033,381, filed on Jun. 2, 2020.

(51) Int. Cl.
*H04L 9/40* (2022.01)
*H04W 12/08* (2021.01)

(52) U.S. Cl.
CPC .......... *H04L 63/08* (2013.01); *H04L 63/0807* (2013.01); *H04L 63/10* (2013.01);
(Continued)

(58) Field of Classification Search
None
See application file for complete search history.

(56) References Cited

U.S. PATENT DOCUMENTS

| | | | | |
|---|---|---|---|---|
| 5,678,041 A | * | 10/1997 | Baker | H04L 63/102 |
| | | | | 707/999.009 |
| 6,715,080 B1 | * | 3/2004 | Starkovich | H04L 63/0807 |
| | | | | 709/228 |

(Continued)

FOREIGN PATENT DOCUMENTS

| | | | |
|---|---|---|---|
| CN | 105791259 A  * | 7/2016 | |
| WO | WO-2019246568 A1 * | 12/2019 | ......... G06F 21/6245 |
| WO | WO-2021198721 A1 * | 10/2021 | |

OTHER PUBLICATIONS

Toit "A Model for a Mobile Operating Environment," Thesis, University of Johannesburg, Oct. 2018, pp. 1-24 (Year: 2018).*

(Continued)

*Primary Examiner* — Luu T Pham
*Assistant Examiner* — James J Wilcox
(74) *Attorney, Agent, or Firm* — Tuggle Duggins P.A.; Blake P. Hurt

(57) ABSTRACT

In one aspect, the present disclosure relates to a method comprising: receiving an input from a user; verifying the security clearance level in accordance with a user of the user interface; analyzing at least one security clearance level associated with each portion of the data request; locating a data element located in at least one external database, the data element being associated with the data request; parsing the data element, the parsing comprising: determining an allowance of access to at least a portion of the data element in accordance with the following: relevance to the data request, and the verified security clearance level of the user, generating a token, the token being configured to allow access data element, the token comprising a security layer in accordance with the parsing of the data element; and transmitting the token to the user device.

9 Claims, 7 Drawing Sheets

(52) U.S. Cl.
CPC .......... *H04L 63/105* (2013.01); *H04L 63/107* (2013.01); *H04W 12/08* (2013.01)

(56) References Cited

U.S. PATENT DOCUMENTS

| | | | | |
|---|---|---|---|---|
| 6,765,901 B1 * | 7/2004 | Johnson | ................ | H04L 69/161 370/352 |
| 6,889,210 B1 * | 5/2005 | Vainstein | ................ | H04L 63/08 705/50 |
| 7,136,782 B1 * | 11/2006 | Araki | ................ | G05B 23/0221 702/188 |
| 7,178,033 B1 * | 2/2007 | Garcia | ................ | G06F 21/6209 713/184 |
| 7,260,836 B2 * | 8/2007 | Roskind | ................ | H04L 63/083 713/157 |
| 7,293,175 B2 * | 11/2007 | Brown | ................ | H04L 63/105 713/166 |
| 7,570,640 B2 * | 8/2009 | LaVigne | ................ | H04L 63/101 370/392 |
| 7,596,260 B2 * | 9/2009 | Tedesco | ................ | A61P 29/00 382/103 |
| 7,669,051 B2 * | 2/2010 | Redlich | ................ | G06F 21/6254 713/166 |
| 7,685,206 B1 * | 3/2010 | Mathew | ................ | H04L 63/105 707/785 |
| RE41,546 E * | 8/2010 | Vainstein | ................ | H04L 63/12 705/52 |
| 7,854,009 B2 * | 12/2010 | Kim | ................ | H04L 63/08 713/1 |
| 7,921,284 B1 * | 4/2011 | Kinghorn | ................ | H04L 67/01 713/160 |
| 7,930,756 B1 * | 4/2011 | Crocker | ................ | H04L 63/105 726/28 |
| 8,079,081 B1 * | 12/2011 | Lavrik | ................ | H04L 41/069 726/22 |
| 8,141,127 B1 * | 3/2012 | Mustafa | ................ | G06F 21/552 726/1 |
| 8,279,106 B1 * | 10/2012 | Wittenberg | ................ | G01S 13/66 342/25 R |
| 8,359,643 B2 * | 1/2013 | Low | ................ | H04L 9/40 370/254 |
| 8,365,254 B2 * | 1/2013 | Burke | ................ | G06F 21/6218 726/21 |
| 8,438,633 B1 * | 5/2013 | Backholm | ................ | H04W 12/06 726/17 |
| 8,595,501 B2 * | 11/2013 | Rose | ................ | H04L 63/0435 713/172 |
| 8,625,796 B1 * | 1/2014 | Ben Ayed | ................ | H04W 12/64 380/258 |
| 8,631,048 B1 * | 1/2014 | Davis | ................ | G06F 16/211 707/803 |
| 8,646,060 B1 * | 2/2014 | Ben Ayed | ................ | H04W 4/20 726/9 |
| 8,654,672 B1 * | 2/2014 | Nicholas | ................ | H04Q 1/20 703/22 |
| 8,683,052 B1 * | 3/2014 | Brinskelle | ................ | H04L 63/04 709/228 |
| 8,713,690 B2 * | 4/2014 | Harada | ................ | H04L 67/02 726/28 |
| 8,769,610 B1 * | 7/2014 | Giguiere | ................ | H04L 67/1044 726/4 |
| 8,782,782 B1 * | 7/2014 | Dicovitsky | ................ | H04L 63/102 709/224 |
| 8,793,776 B1 * | 7/2014 | Jackson | ................ | H04W 4/021 726/7 |
| 8,798,645 B2 * | 8/2014 | Haney | ................ | H04W 4/10 455/456.2 |
| 8,799,674 B1 * | 8/2014 | Leighton | ................ | G06Q 30/0635 713/189 |
| 8,819,769 B1 * | 8/2014 | van Dijk | ................ | H04L 67/303 726/1 |
| 8,832,801 B1 * | 9/2014 | Ganesan | ................ | H04L 63/08 713/168 |
| 8,849,255 B2 * | 9/2014 | Choti | ................ | H04L 63/104 455/418 |
| 8,875,263 B1 * | 10/2014 | van Dijk | ................ | H04L 63/0846 709/225 |
| 8,909,415 B1 * | 12/2014 | Hawley | ................ | H04W 4/38 701/32.3 |
| 8,996,860 B1 * | 3/2015 | Roth | ................ | H04L 67/142 713/153 |
| 9,002,750 B1 * | 4/2015 | Chu | ................ | H04W 12/04 705/72 |
| 9,009,805 B1 * | 4/2015 | Kirkby | ................ | H04N 21/4622 709/224 |
| 9,030,351 B2 * | 5/2015 | Fox | ................ | G01S 13/723 342/28 |
| 9,031,714 B1 * | 5/2015 | Everett | ................ | G06F 9/451 701/2 |
| 9,032,501 B1 * | 5/2015 | Martin | ................ | H04W 12/35 713/169 |
| 9,038,148 B1 * | 5/2015 | Roth | ................ | G06F 21/33 726/5 |
| 9,106,682 B2 * | 8/2015 | Foley | ................ | H04L 63/14 |
| 9,112,849 B1 * | 8/2015 | Werkelin Ahlin | ................ | G06F 3/00 |
| 9,160,742 B1 * | 10/2015 | Ackerman | ................ | H04L 63/0876 |
| 9,166,961 B1 * | 10/2015 | Johansson | ................ | H04L 63/102 |
| 9,172,709 B2 * | 10/2015 | Dean | ................ | H04L 67/51 |
| 9,203,818 B1 * | 12/2015 | Roth | ................ | H04L 63/20 |
| 9,203,837 B2 * | 12/2015 | Pierson | ................ | H04L 63/08 |
| 9,240,986 B1 * | 1/2016 | Ackerman | ................ | H04L 63/0838 |
| 9,264,418 B1 * | 2/2016 | Crosley | ................ | H04L 63/08 |
| 9,288,190 B1 * | 3/2016 | Brinskelle | ................ | H04L 63/1433 |
| 9,313,208 B1 * | 4/2016 | Letz | ................ | H04L 41/5074 |
| 9,386,006 B1 * | 7/2016 | Maldaner | ................ | G06F 40/134 |
| 9,401,926 B1 * | 7/2016 | Dubow | ................ | H04L 63/102 |
| 9,455,972 B1 * | 9/2016 | Dotan | ................ | H04W 12/35 |
| 9,479,512 B2 * | 10/2016 | Castro | ................ | H04W 12/30 |
| 9,491,155 B1 * | 11/2016 | Johansson | ................ | G06F 21/604 |
| 9,503,452 B1 * | 11/2016 | Kumar | ................ | H04L 63/0838 |
| 9,531,710 B2 * | 12/2016 | Deutschmann | ................ | H04L 63/0884 |
| 9,537,845 B1 * | 1/2017 | Juels | ................ | G06F 21/552 |
| 9,553,757 B1 * | 1/2017 | Roth | ................ | H04L 67/01 |
| 9,553,867 B2 * | 1/2017 | Kahol | ................ | H04L 63/0281 |
| 9,565,200 B2 * | 2/2017 | Bacastow | ................ | H04L 63/10 |
| 9,576,147 B1 * | 2/2017 | McClintock | ................ | G06F 21/6245 |
| 9,602,508 B1 * | 3/2017 | Mahaffey | ................ | H04L 9/3271 |
| 9,613,535 B2 * | 4/2017 | Borri | ................ | G08G 5/0069 |
| 9,646,300 B1 * | 5/2017 | Zhou | ................ | G06Q 20/3278 |
| 9,679,152 B1 * | 6/2017 | Young | ................ | G06F 21/31 |
| 9,680,812 B1 * | 6/2017 | Emaminouri | ................ | H04L 63/0861 |
| 9,692,751 B1 * | 6/2017 | Frohman | ................ | G06F 21/35 |
| 9,716,743 B2 * | 7/2017 | Mickens | ................ | H04L 67/025 |
| 9,755,834 B1 * | 9/2017 | Johnson | ................ | H04L 9/3234 |
| 9,773,119 B2 * | 9/2017 | Sinha | ................ | H04L 63/083 |
| 9,781,126 B1 * | 10/2017 | Winn | ................ | H04L 63/101 |
| 9,787,671 B1 * | 10/2017 | Bogrett | ................ | G06F 16/9038 |
| 9,819,663 B1 * | 11/2017 | Gauda | ................ | G06F 21/10 |
| 9,820,146 B2 * | 11/2017 | Gross | ................ | H04B 3/52 |
| 9,825,925 B2 * | 11/2017 | Hore | ................ | H04L 63/06 |
| 9,825,934 B1 * | 11/2017 | Alexander | ................ | H04L 63/0815 |
| 9,871,778 B1 * | 1/2018 | Taralika | ................ | H04L 63/0853 |
| 9,871,874 B2 * | 1/2018 | Diem | ................ | G06F 16/9535 |
| 9,894,199 B1 * | 2/2018 | Wiechman | ................ | H04W 12/06 |
| 9,906,519 B1 * | 2/2018 | Kotamraju | ................ | H04L 63/08 |
| 9,923,885 B2 * | 3/2018 | Dorfman | ................ | H04L 63/0861 |
| 9,928,839 B1 * | 3/2018 | Lester | ................ | H04L 63/0861 |
| 9,942,222 B1 * | 4/2018 | Fenton | ................ | H04L 63/0853 |
| 10,026,245 B2 * | 7/2018 | Warren | ................ | H04L 63/18 |
| 10,069,817 B2 * | 9/2018 | Forguson | ................ | H04L 63/083 |
| 10,075,334 B1 * | 9/2018 | Kozura | ................ | H04W 12/086 |
| 10,075,435 B1 * | 9/2018 | Byrd | ................ | H04L 63/0853 |
| 10,075,473 B2 * | 9/2018 | Ruppin | ................ | G06F 16/178 |
| 10,084,600 B1 * | 9/2018 | Irwan | ................ | H04L 63/08 |
| 10,147,502 B2 * | 12/2018 | Paffel | ................ | G16Z 99/00 |
| 10,148,694 B1 * | 12/2018 | Sarin | ................ | H04L 63/14 |
| 10,158,634 B2 * | 12/2018 | Votaw | ................ | G06V 30/40 |
| 10,158,639 B1 * | 12/2018 | Goben | ................ | H04L 63/10 |
| 10,205,718 B1 * | 2/2019 | Chang | ................ | H04L 63/0815 |
| 10,212,157 B2 * | 2/2019 | Dolan | ................ | G06F 21/31 |
| 10,217,375 B2 * | 2/2019 | Waldron | ................ | H04L 63/08 |

(56) References Cited

U.S. PATENT DOCUMENTS

| | | | |
|---|---|---|---|
| 10,218,506 B1* | 2/2019 | Bhabbur | H04L 63/10 |
| 10,262,129 B1* | 4/2019 | Gupta | G06F 16/3344 |
| 10,270,592 B1* | 4/2019 | Ghetti | H04L 63/0428 |
| 10,272,570 B2* | 4/2019 | Storr | B25J 9/1674 |
| 10,275,140 B1* | 4/2019 | Miller | G06F 3/04817 |
| 10,284,541 B1* | 5/2019 | Subramanian | H04W 64/00 |
| 10,289,390 B2* | 5/2019 | Samatov | G06F 8/61 |
| 10,298,556 B2* | 5/2019 | Lasi | H04L 63/061 |
| 10,326,733 B2* | 6/2019 | Bokare | H04L 63/0815 |
| 10,341,304 B1* | 7/2019 | Boutros | H04L 63/06 |
| 10,354,093 B1* | 7/2019 | Farber | G06F 21/6218 |
| 10,375,060 B1* | 8/2019 | Graves | H04W 12/77 |
| 10,389,735 B1* | 8/2019 | Bhattacharjya | H04L 63/102 |
| 10,410,016 B1* | 9/2019 | Damick | H04L 63/0435 |
| 10,430,786 B1* | 10/2019 | Camacho | H04L 63/0823 |
| 10,469,457 B1* | 11/2019 | Sokolov | H04L 63/061 |
| 10,469,506 B2* | 11/2019 | Salkini | H04W 4/14 |
| 10,469,644 B1* | 11/2019 | Rao | G06Q 50/12 |
| 10,484,430 B2* | 11/2019 | Prasad | H04L 63/107 |
| 10,505,925 B1* | 12/2019 | Doloff | H04L 63/101 |
| 10,541,981 B1* | 1/2020 | Conley | H04W 12/02 |
| 10,553,090 B1* | 2/2020 | Tolliver | G08B 25/10 |
| 10,554,657 B1* | 2/2020 | Siddiqui | H04L 63/0861 |
| D877,757 S* | 3/2020 | Elder | D14/485 |
| 10,609,041 B1* | 3/2020 | Wilczynski | G06F 21/62 |
| 10,623,390 B1* | 4/2020 | Rosenhouse | H04L 67/10 |
| 10,623,575 B1* | 4/2020 | Synal | H04M 3/563 |
| 10,630,648 B1* | 4/2020 | Borunda | H04L 9/3213 |
| 10,630,937 B1* | 4/2020 | Low | H04M 1/72439 |
| 10,657,242 B1* | 5/2020 | Xia | H04L 9/0825 |
| 10,666,657 B1* | 5/2020 | Threlkeld | H04L 9/0643 |
| 10,673,862 B1* | 6/2020 | Threlkeld | G06F 21/62 |
| 10,715,514 B1* | 7/2020 | Threlkeld | H04L 63/0807 |
| 10,721,226 B1* | 7/2020 | Kurani | H04L 63/0861 |
| 10,742,831 B1* | 8/2020 | Haapanen | H04N 1/00856 |
| 10,762,183 B1* | 9/2020 | Charan | G06F 21/40 |
| 10,771,468 B1* | 9/2020 | Walker | H04L 63/0281 |
| 10,783,261 B1* | 9/2020 | Gu | G06V 40/172 |
| 10,798,079 B2* | 10/2020 | Miramonti | H04L 63/061 |
| 10,817,619 B1* | 10/2020 | Kolli | G06F 21/552 |
| 10,885,220 B2* | 1/2021 | Sharma | H04L 63/083 |
| 10,887,307 B1* | 1/2021 | Newstadt | H04L 63/102 |
| 10,904,024 B2* | 1/2021 | Skiff | H04L 63/0245 |
| 10,922,425 B2* | 2/2021 | Gollogly | H04L 63/105 |
| 10,924,473 B2* | 2/2021 | Genner | G06Q 40/03 |
| 10,949,541 B1* | 3/2021 | Joshi | H04L 63/1425 |
| 10,958,649 B2* | 3/2021 | Delcourt | G06F 21/554 |
| 10,958,662 B1* | 3/2021 | Sole | H04L 63/0853 |
| 10,979,423 B1* | 4/2021 | Garner, IV | H04L 67/306 |
| 10,990,584 B1* | 4/2021 | Basak | G06F 16/28 |
| 10,999,262 B1* | 5/2021 | Ramanujan | H04L 63/0485 |
| 11,019,053 B2* | 5/2021 | Hamel | H04L 9/3239 |
| 11,039,314 B2* | 6/2021 | Tali | H04W 4/021 |
| 11,044,246 B1* | 6/2021 | Freeling | G06Q 30/0601 |
| 11,050,691 B1* | 6/2021 | DePue | H04W 12/062 |
| 11,093,944 B1* | 8/2021 | Tesser | H04L 63/0853 |
| 11,128,464 B1* | 9/2021 | Loladia | H04L 63/0807 |
| 11,190,516 B1* | 11/2021 | Loladia | H04L 63/0876 |
| 11,196,555 B1* | 12/2021 | Mouraveiko | G06F 21/64 |
| 11,233,799 B1* | 1/2022 | Whyte | G06F 21/44 |
| 11,238,683 B1* | 2/2022 | Mars | H04W 12/084 |
| 11,240,025 B2* | 2/2022 | Wentz | G06F 21/602 |
| 11,250,055 B2* | 2/2022 | Micucci | H04L 63/08 |
| 11,283,884 B2* | 3/2022 | Mercadie | H04L 63/10 |
| 11,316,862 B1* | 4/2022 | Pate | G06F 21/44 |
| 11,327,642 B1* | 5/2022 | Miller | G06F 16/90328 |
| 11,328,354 B1* | 5/2022 | Maeng | G06Q 40/03 |
| 11,334,069 B1* | 5/2022 | Buerger | H04L 41/046 |
| 11,356,259 B1* | 6/2022 | Agnew | H04L 9/3271 |
| 11,386,412 B1* | 7/2022 | Brandt | H04M 3/5183 |
| 11,463,934 B1* | 10/2022 | Kwon | H04L 45/32 |
| 11,481,837 B1* | 10/2022 | Brandt | G06F 21/45 |
| 11,522,842 B2* | 12/2022 | Lee | G06F 3/0659 |
| 11,539,709 B2* | 12/2022 | Bhaskar S | H04L 63/102 |
| 11,552,799 B1* | 1/2023 | Parikh | G06F 16/2365 |
| 11,558,365 B1* | 1/2023 | McCorkendale | H04L 63/083 |
| 11,586,711 B2* | 2/2023 | Smith | G06F 21/44 |
| 11,593,826 B1* | 2/2023 | Chen | A63F 13/69 |
| 11,605,144 B1* | 3/2023 | Miller | G06Q 10/06311 |
| 11,663,350 B2* | 5/2023 | Demonsant | G06F 21/6218 709/204 |
| 11,736,468 B2* | 8/2023 | Lowe | G06F 21/35 |
| 11,748,834 B1* | 9/2023 | Miller | G06Q 10/0635 705/7.15 |
| 11,818,111 B1* | 11/2023 | Debolt | G06N 3/006 |
| 11,823,121 B2* | 11/2023 | Moore | G06Q 20/203 |
| 11,997,219 B1* | 5/2024 | Russell | H04L 9/3268 |
| 12,001,306 B2* | 6/2024 | Gandhi | H04L 67/34 |
| 2002/0053020 A1* | 5/2002 | Teijido | H04L 63/0869 713/153 |
| 2002/0091975 A1* | 7/2002 | Redlich | H04L 63/0428 714/699 |
| 2002/0099959 A1* | 7/2002 | Redlich | G06F 21/554 713/150 |
| 2002/0184344 A1* | 12/2002 | Elvanoglu | G06F 21/6245 709/219 |
| 2002/0194350 A1* | 12/2002 | Lu | H04L 67/02 709/225 |
| 2003/0051054 A1* | 3/2003 | Redlich | H04L 63/20 709/206 |
| 2003/0084168 A1* | 5/2003 | Erickson | H04L 63/102 707/999.009 |
| 2003/0120949 A1* | 6/2003 | Redlich | C07K 14/70575 726/21 |
| 2003/0140256 A1* | 7/2003 | Hauenstein | H04M 17/00 726/10 |
| 2003/0182435 A1* | 9/2003 | Redlich | G06F 21/62 726/16 |
| 2003/0196108 A1* | 10/2003 | Kung | H04L 9/3268 713/175 |
| 2003/0204626 A1* | 10/2003 | Wheeler | H04L 63/10 709/245 |
| 2004/0030492 A1* | 2/2004 | Fox | G06T 3/40 701/455 |
| 2004/0038667 A1* | 2/2004 | Vance, Jr. | H04L 63/10 455/410 |
| 2004/0068446 A1* | 4/2004 | Do | G06Q 20/3224 705/27.1 |
| 2004/0111639 A1* | 6/2004 | Schwartz | H04L 63/105 726/1 |
| 2004/0186989 A1* | 9/2004 | Clapper | G06F 21/6281 713/151 |
| 2005/0005110 A1* | 1/2005 | Kim | H04L 63/101 713/166 |
| 2005/0052714 A1* | 3/2005 | Klug | G03H 1/268 359/3 |
| 2005/0066192 A1* | 3/2005 | Handy Bosma | H04L 63/083 726/4 |
| 2005/0076199 A1* | 4/2005 | Thornton | H04L 9/3226 709/207 |
| 2005/0096065 A1* | 5/2005 | Fleischman | H04L 45/16 455/456.1 |
| 2005/0102526 A1* | 5/2005 | Davey | H04L 63/0428 713/188 |
| 2005/0138110 A1* | 6/2005 | Redlich | G06F 21/6254 709/201 |
| 2005/0182767 A1* | 8/2005 | Shoemaker | H04L 67/1095 |
| 2005/0195096 A1* | 9/2005 | Ward | G01C 21/005 340/995.14 |
| 2005/0210009 A1* | 9/2005 | Tran | H04L 63/08 |
| 2005/0216770 A1* | 9/2005 | Rowett | H04L 63/101 726/5 |
| 2005/0240418 A1* | 10/2005 | Chappuis | G06Q 20/326 705/44 |
| 2006/0059333 A1* | 3/2006 | Gentry | H04L 9/3236 713/156 |
| 2006/0075228 A1* | 4/2006 | Black | H04L 63/104 713/167 |
| 2006/0102717 A1* | 5/2006 | Wood | G06Q 10/10 235/382 |

(56) References Cited

U.S. PATENT DOCUMENTS

| | | | |
|---|---|---|---|
| 2006/0117372 A1* | 6/2006 | Hopkins | H04N 21/4722 725/50 |
| 2006/0143136 A1* | 6/2006 | Low | H04L 63/08 705/64 |
| 2006/0184801 A1* | 8/2006 | Wood | G07C 9/22 713/186 |
| 2006/0238406 A1* | 10/2006 | Nohara | G01S 7/068 342/197 |
| 2007/0050239 A1* | 3/2007 | Caneva | G06Q 10/06398 705/7.41 |
| 2007/0073673 A1* | 3/2007 | McVeigh | G06F 16/256 |
| 2007/0106434 A1* | 5/2007 | Galbraith, II | B61L 25/08 701/19 |
| 2007/0112580 A1* | 5/2007 | Tang-Talpin | H04N 21/4333 348/E5.004 |
| 2007/0123122 A1* | 5/2007 | Puzella | B63B 22/24 441/11 |
| 2007/0124382 A1* | 5/2007 | Hughes | H04N 7/152 709/205 |
| 2007/0136603 A1* | 6/2007 | Kuecuekyan | H04L 63/0884 713/185 |
| 2007/0143860 A1* | 6/2007 | Hardt | H04L 63/0421 726/28 |
| 2007/0186105 A1* | 8/2007 | Bailey | H04L 63/0492 713/168 |
| 2007/0208725 A1* | 9/2007 | Gilger | G06F 16/40 |
| 2007/0262874 A1* | 11/2007 | Sumrall | F42B 12/365 340/539.13 |
| 2007/0288208 A1* | 12/2007 | Grigsby | G06Q 10/06 703/2 |
| 2007/0300306 A1* | 12/2007 | Hussain | G06F 21/6227 726/27 |
| 2008/0016344 A1* | 1/2008 | Holden | H04L 67/563 713/166 |
| 2008/0066185 A1* | 3/2008 | Lester | H04L 63/101 726/27 |
| 2008/0109470 A1* | 5/2008 | McGee | H04L 67/12 707/999.102 |
| 2008/0141333 A1* | 6/2008 | Chen | H04L 47/805 726/1 |
| 2008/0150788 A1* | 6/2008 | Sumrall | F42B 30/00 102/513 |
| 2008/0168135 A1* | 7/2008 | Redlich | G06F 21/6218 709/204 |
| 2008/0215298 A1* | 9/2008 | Haney | G06F 18/251 702/189 |
| 2009/0006256 A1* | 1/2009 | Lazovsky | G06Q 30/0601 705/26.1 |
| 2009/0015460 A1* | 1/2009 | Fox | G01S 13/867 342/53 |
| 2009/0017853 A1* | 1/2009 | Ozog | H04M 11/022 455/509 |
| 2009/0055477 A1* | 2/2009 | Flesher | H04L 63/302 709/204 |
| 2009/0087029 A1* | 4/2009 | Coleman | G06V 10/255 382/103 |
| 2009/0100165 A1* | 4/2009 | Wesley, Sr. | G06F 16/245 709/223 |
| 2009/0201380 A1* | 8/2009 | Peaslee | H04N 19/51 348/208.4 |
| 2009/0216775 A1* | 8/2009 | Ratliff | G06Q 10/08 |
| 2009/0222527 A1* | 9/2009 | Arconati | H04L 51/224 709/206 |
| 2009/0234499 A1* | 9/2009 | Nielsen | B25J 9/161 700/250 |
| 2009/0240481 A1* | 9/2009 | Durrant-Whyte | G06Q 10/06 703/7 |
| 2009/0248789 A1* | 10/2009 | Fong | H04L 63/0807 709/202 |
| 2009/0255763 A1* | 10/2009 | Nieboer | H01Q 1/125 187/277 |
| 2009/0259611 A1* | 10/2009 | Wang | H04L 63/101 706/47 |
| 2009/0281850 A1* | 11/2009 | Bruce | H04W 4/90 701/532 |
| 2009/0300350 A1* | 12/2009 | Gai | H04L 63/0272 713/160 |
| 2009/0323087 A1* | 12/2009 | Luo | G06F 21/608 358/1.9 |
| 2010/0010968 A1* | 1/2010 | Redlich | G06Q 10/00 707/E17.046 |
| 2010/0027521 A1* | 2/2010 | Huber | H04L 5/0048 370/338 |
| 2010/0031342 A1* | 2/2010 | Vogsland | H04L 67/131 726/17 |
| 2010/0082981 A1* | 4/2010 | Church | G06Q 10/107 713/168 |
| 2010/0122334 A1* | 5/2010 | Stanzione | G06Q 10/06 713/150 |
| 2010/0191613 A1* | 7/2010 | Raleigh | H04M 15/49 705/40 |
| 2010/0241698 A1* | 9/2010 | Hillerbrand | G06F 16/13 707/813 |
| 2010/0241844 A1* | 9/2010 | Hussain | G06F 21/6218 713/150 |
| 2010/0250003 A1* | 9/2010 | Nieboer | F16M 11/046 356/402 |
| 2010/0257028 A1* | 10/2010 | Hillerbrand | G06Q 10/067 705/26.1 |
| 2010/0257587 A1* | 10/2010 | Chazin | H04L 67/02 726/3 |
| 2010/0280755 A1* | 11/2010 | Pillsbury | G06Q 30/02 702/19 |
| 2010/0291899 A1* | 11/2010 | Machani | H04W 12/082 455/411 |
| 2010/0305806 A1* | 12/2010 | Hawley | H04W 4/029 701/31.4 |
| 2010/0313146 A1* | 12/2010 | Nielsen | G06T 19/006 715/757 |
| 2010/0321156 A1* | 12/2010 | Pitt | G06F 16/951 340/5.82 |
| 2010/0325156 A1* | 12/2010 | Plainfield | G06F 21/6218 707/E17.014 |
| 2011/0007157 A1* | 1/2011 | Sekelsky | G01S 13/867 348/143 |
| 2011/0041170 A1* | 2/2011 | Wankmueller | H04L 63/12 715/764 |
| 2011/0047230 A1* | 2/2011 | McGee | H04L 69/40 709/217 |
| 2011/0054689 A1* | 3/2011 | Nielsen | G05D 1/0214 700/258 |
| 2011/0066606 A1* | 3/2011 | Fox | G06F 16/2455 707/706 |
| 2011/0066851 A1* | 3/2011 | Bello | H04L 63/08 709/225 |
| 2011/0067086 A1* | 3/2011 | Nachenberg | H04L 63/105 726/2 |
| 2011/0077001 A1* | 3/2011 | Brown | H04W 24/00 455/426.1 |
| 2011/0106759 A1* | 5/2011 | Brown, III | G06Q 10/06 707/622 |
| 2011/0125844 A1* | 5/2011 | Collier | H04W 4/38 709/204 |
| 2011/0145593 A1* | 6/2011 | Auradkar | H04L 9/0833 713/189 |
| 2011/0169634 A1* | 7/2011 | Raj | G08B 27/00 340/540 |
| 2011/0173443 A1* | 7/2011 | Osterwalder | H04L 63/123 713/168 |
| 2011/0191237 A1* | 8/2011 | Faith | G06Q 20/40 705/1.1 |
| 2011/0197218 A1* | 8/2011 | Wagner | H04L 63/0815 725/30 |
| 2011/0202466 A1* | 8/2011 | Carter | H04W 4/023 705/67 |
| 2011/0202755 A1* | 8/2011 | Orsini | H04L 9/0816 713/151 |

(56) References Cited

U.S. PATENT DOCUMENTS

| | | | |
|---|---|---|---|
| 2011/0231921 A1* | 9/2011 | Narayanan | G06F 21/335 726/9 |
| 2011/0257956 A1* | 10/2011 | Goel | H02J 13/00028 703/18 |
| 2011/0276604 A1* | 11/2011 | Hom | H04L 63/20 726/21 |
| 2011/0311111 A1* | 12/2011 | Allburn | G06V 40/13 382/115 |
| 2012/0011126 A1* | 1/2012 | Park | G06F 16/2471 707/769 |
| 2012/0011141 A1* | 1/2012 | Park | G06F 16/24522 707/E17.069 |
| 2012/0022942 A1* | 1/2012 | Holloway | H04L 63/102 705/14.49 |
| 2012/0030733 A1* | 2/2012 | Andrews | H04L 63/105 726/4 |
| 2012/0044043 A1* | 2/2012 | Nettleton | G05B 19/4148 340/3.7 |
| 2012/0046818 A1* | 2/2012 | Nettleton | E21F 17/00 700/95 |
| 2012/0046927 A1* | 2/2012 | Nettleton | E21C 41/26 703/6 |
| 2012/0046983 A1* | 2/2012 | Nettleton | G06Q 10/00 705/7.12 |
| 2012/0053703 A1* | 3/2012 | Nettleton | E21C 41/26 700/9 |
| 2012/0053775 A1* | 3/2012 | Nettleton | G06Q 10/06 701/24 |
| 2012/0060030 A1* | 3/2012 | Lamb | H04L 63/0876 726/2 |
| 2012/0072979 A1* | 3/2012 | Cha | H04W 12/069 726/8 |
| 2012/0079034 A1* | 3/2012 | Farrell | H04L 51/212 709/206 |
| 2012/0094697 A1* | 4/2012 | Conner | H04M 1/27475 455/456.3 |
| 2012/0136954 A1* | 5/2012 | Davis | H04L 67/12 709/206 |
| 2012/0140767 A1* | 6/2012 | Brothers | H04L 67/565 370/352 |
| 2012/0185911 A1* | 7/2012 | Polite | H04L 63/102 726/1 |
| 2012/0202459 A1* | 8/2012 | Martell | H04L 63/083 455/410 |
| 2012/0231787 A1* | 9/2012 | Conner | H04L 65/1053 455/426.1 |
| 2012/0304085 A1* | 11/2012 | Kim | H04N 7/185 715/763 |
| 2012/0311686 A1* | 12/2012 | Medina | H04L 63/0823 726/7 |
| 2012/0317239 A1* | 12/2012 | Mulder | G06F 40/166 709/219 |
| 2013/0007123 A1* | 1/2013 | Crosbie | H04L 63/107 709/204 |
| 2013/0097688 A1* | 4/2013 | Bradley, II | G06F 21/6218 726/9 |
| 2013/0098309 A1* | 4/2013 | Nohara | A01M 29/18 119/713 |
| 2013/0117802 A1* | 5/2013 | Fendt | H04L 63/10 726/4 |
| 2013/0167193 A1* | 6/2013 | Brookins | H04L 63/20 726/1 |
| 2013/0187834 A1* | 7/2013 | Nohara | G01S 13/42 345/8 |
| 2013/0191929 A1* | 7/2013 | Yin | H04L 63/102 726/28 |
| 2013/0198197 A1* | 8/2013 | Sawhney | G06F 40/30 707/E17.014 |
| 2013/0198509 A1* | 8/2013 | Buruganahalli | H04L 63/1408 713/151 |
| 2013/0226800 A1* | 8/2013 | Patel | H04L 63/107 705/44 |
| 2013/0232543 A1* | 9/2013 | Cheng | H04L 63/20 726/1 |
| 2013/0246396 A1* | 9/2013 | Clare | G06F 16/248 707/722 |
| 2013/0254831 A1* | 9/2013 | Roach | H04W 12/082 726/1 |
| 2013/0287290 A1* | 10/2013 | Owechko | G06T 7/344 382/154 |
| 2013/0298209 A1* | 11/2013 | Targali | H04W 12/06 726/6 |
| 2013/0321458 A1* | 12/2013 | Miserendino | G06T 11/60 345/629 |
| 2013/0325787 A1* | 12/2013 | Gerken | G06N 5/048 706/52 |
| 2014/0007157 A1* | 1/2014 | Harrison | H04L 67/02 725/32 |
| 2014/0007195 A1* | 1/2014 | Gupta | H04L 63/0876 726/4 |
| 2014/0007205 A1* | 1/2014 | Oikonomou | G06F 21/36 726/6 |
| 2014/0020073 A1* | 1/2014 | Ronda | H04L 63/0853 726/7 |
| 2014/0038511 A1* | 2/2014 | Hall | H04W 4/029 455/3.01 |
| 2014/0047234 A1* | 2/2014 | Davis | G06Q 10/10 713/160 |
| 2014/0047356 A1* | 2/2014 | Ameller-Van-Baumberghen | H04L 65/403 715/753 |
| 2014/0047556 A1* | 2/2014 | Davis | G06F 21/6209 726/28 |
| 2014/0075514 A1* | 3/2014 | Prasad | H04L 63/08 726/4 |
| 2014/0097979 A1* | 4/2014 | Nohara | G01S 13/87 342/90 |
| 2014/0108156 A1* | 4/2014 | Hillerbrand | G06Q 50/01 705/14.66 |
| 2014/0123237 A1* | 5/2014 | Gaudet | G06F 21/60 726/4 |
| 2014/0129511 A1* | 5/2014 | Bramel | G06F 21/6218 707/600 |
| 2014/0129936 A1* | 5/2014 | Richards | G06F 16/248 715/716 |
| 2014/0137206 A1* | 5/2014 | Hansmann | H04W 12/04 726/4 |
| 2014/0137208 A1* | 5/2014 | Harts | H04L 63/102 726/4 |
| 2014/0137223 A1* | 5/2014 | Wagner | H04L 63/0815 726/7 |
| 2014/0148123 A1* | 5/2014 | Raleigh | H04W 12/08 455/406 |
| 2014/0157392 A1* | 6/2014 | Smith | H04L 63/10 726/9 |
| 2014/0162598 A1* | 6/2014 | Villa-Real | G07F 7/0886 455/411 |
| 2014/0165189 A1* | 6/2014 | Foley | H04L 63/20 726/22 |
| 2014/0173693 A1* | 6/2014 | Bikkula | H04L 63/0815 726/4 |
| 2014/0173695 A1* | 6/2014 | Valdivia | G06F 21/33 726/4 |
| 2014/0187190 A1* | 7/2014 | Schuler | H04W 12/084 455/404.1 |
| 2014/0189802 A1* | 7/2014 | Montgomery | G06F 21/6218 726/4 |
| 2014/0196104 A1* | 7/2014 | Chari | H04L 63/102 726/1 |
| 2014/0196115 A1* | 7/2014 | Pelykh | H04L 63/08 726/4 |
| 2014/0210658 A1* | 7/2014 | Ponsford | G08G 3/02 342/41 |
| 2014/0214469 A1* | 7/2014 | Callow | G06Q 10/063114 705/7.15 |
| 2014/0222941 A1* | 8/2014 | Tabone | H04L 67/10 709/208 |

(56) References Cited

U.S. PATENT DOCUMENTS

| | | | |
|---|---|---|---|
| 2014/0225590 A1* | 8/2014 | Jacobs | G01R 23/16 324/76.19 |
| 2014/0282911 A1* | 9/2014 | Bare | H04L 67/131 726/4 |
| 2014/0282934 A1* | 9/2014 | Miasnik | H04W 4/02 726/5 |
| 2014/0283120 A1* | 9/2014 | Mao | G06F 21/6218 726/28 |
| 2014/0297386 A1* | 10/2014 | Allen | H04L 67/56 705/14.27 |
| 2014/0315571 A1* | 10/2014 | Saari | H04W 4/029 455/456.1 |
| 2014/0337503 A1* | 11/2014 | Hefetz | G06Q 30/06 709/223 |
| 2014/0337921 A1* | 11/2014 | Hanna, Jr. | H04L 63/107 726/3 |
| 2014/0358252 A1* | 12/2014 | Ellsworth | G08B 25/00 700/17 |
| 2014/0359299 A1* | 12/2014 | Jaundalders | H04L 9/3247 713/179 |
| 2014/0359744 A1* | 12/2014 | Hillis | G06F 21/36 726/9 |
| 2014/0373099 A1* | 12/2014 | Durbha | H04L 63/10 726/4 |
| 2014/0380453 A1* | 12/2014 | Alonso Cebrian | H04L 63/0869 726/5 |
| 2015/0006346 A1* | 1/2015 | Amancherla | G06Q 40/02 705/35 |
| 2015/0020162 A1* | 1/2015 | Hefetz | G06Q 20/4016 726/3 |
| 2015/0020213 A1* | 1/2015 | Decouteau | H04L 63/105 726/27 |
| 2015/0026757 A1* | 1/2015 | Reddy | H04L 63/20 726/4 |
| 2015/0029332 A1* | 1/2015 | Milstead | H04N 7/183 348/143 |
| 2015/0033297 A1* | 1/2015 | Sanso | H04L 63/126 726/5 |
| 2015/0074742 A1* | 3/2015 | Kohno | H04L 63/20 726/1 |
| 2015/0101022 A1* | 4/2015 | Zent | H04L 63/104 726/4 |
| 2015/0106882 A1* | 4/2015 | Li | G06F 21/335 726/4 |
| 2015/0106883 A1* | 4/2015 | Miller | G06F 16/93 726/4 |
| 2015/0106888 A1* | 4/2015 | Cheng | H04L 63/10 726/5 |
| 2015/0106895 A1* | 4/2015 | Barbir | H04L 63/08 726/7 |
| 2015/0121462 A1* | 4/2015 | Courage | H04L 63/102 726/4 |
| 2015/0131499 A1* | 5/2015 | Hall | H04L 45/00 370/310 |
| 2015/0131754 A1* | 5/2015 | Whitaker | H01Q 1/34 375/267 |
| 2015/0145991 A1* | 5/2015 | Russell | G06Q 10/103 348/143 |
| 2015/0154543 A1* | 6/2015 | Skaaksrud | G06Q 20/22 705/333 |
| 2015/0156206 A1* | 6/2015 | Redlich | G06F 16/26 726/29 |
| 2015/0163206 A1* | 6/2015 | McCarthy | G06F 21/6227 726/4 |
| 2015/0172294 A1* | 6/2015 | Bittner | G06F 21/6245 726/4 |
| 2015/0172920 A1* | 6/2015 | Ben Ayed | H04W 12/63 713/172 |
| 2015/0179028 A1* | 6/2015 | Bairaktaris | G08B 5/36 340/815.4 |
| 2015/0180857 A1* | 6/2015 | Schulman | H04L 63/08 726/9 |
| 2015/0186635 A1* | 7/2015 | Nakhjiri | H04L 69/22 726/17 |
| 2015/0188900 A1* | 7/2015 | Charbonneau | H04L 63/0807 726/7 |
| 2015/0200922 A1* | 7/2015 | Eschbach | H04L 63/08 358/1.14 |
| 2015/0200940 A1* | 7/2015 | Pace | G06F 21/16 726/3 |
| 2015/0204973 A1* | 7/2015 | Nohara | G01S 7/003 342/107 |
| 2015/0205878 A1* | 7/2015 | Fox | H04W 4/80 707/741 |
| 2015/0215312 A1* | 7/2015 | Cesnik | H04N 21/44008 726/9 |
| 2015/0237073 A1* | 8/2015 | Lang | H04L 63/20 726/1 |
| 2015/0242619 A1* | 8/2015 | Bender | H04L 63/10 726/22 |
| 2015/0242839 A1* | 8/2015 | Sanchez | G06Q 20/24 705/38 |
| 2015/0249651 A1* | 9/2015 | Okamoto | H04L 63/10 713/171 |
| 2015/0254655 A1* | 9/2015 | Bondesen | G06Q 20/3821 705/72 |
| 2015/0257007 A1* | 9/2015 | Solondz | H04L 9/3234 713/154 |
| 2015/0281204 A1* | 10/2015 | Ellis | H04L 45/64 726/9 |
| 2015/0294047 A1* | 10/2015 | Walsh | H04W 4/90 703/6 |
| 2015/0295751 A1* | 10/2015 | Caison | H04L 63/0227 709/218 |
| 2015/0295917 A1* | 10/2015 | Platt | H04L 63/0815 709/228 |
| 2015/0310043 A1* | 10/2015 | Adelman | G06F 16/174 726/5 |
| 2015/0326577 A1* | 11/2015 | Carlson | H04L 9/3271 713/155 |
| 2015/0332424 A1* | 11/2015 | Kane | G06Q 50/265 705/325 |
| 2015/0334207 A1* | 11/2015 | Kane | H04L 63/302 709/203 |
| 2015/0350960 A1* | 12/2015 | Qiang | H04W 16/06 455/411 |
| 2015/0365246 A1* | 12/2015 | Kane | H04W 4/08 709/203 |
| 2016/0004882 A1* | 1/2016 | Ballai | G06F 21/6245 726/30 |
| 2016/0007198 A1* | 1/2016 | Lacey | H04L 63/126 713/175 |
| 2016/0021093 A1* | 1/2016 | Vinckier | H04L 67/10 726/9 |
| 2016/0021117 A1* | 1/2016 | Harmon | H04L 63/20 726/1 |
| 2016/0055188 A1* | 2/2016 | Goel | G06F 21/6218 707/741 |
| 2016/0057168 A1* | 2/2016 | Reddock | H04L 63/105 726/1 |
| 2016/0057626 A1* | 2/2016 | O'Toole | G06Q 30/0226 726/4 |
| 2016/0065588 A1* | 3/2016 | Wheeler | H04L 63/0435 713/160 |
| 2016/0072796 A1* | 3/2016 | Adam | H04L 63/0853 713/159 |
| 2016/0080347 A1* | 3/2016 | Rappaport | G06F 21/6263 726/5 |
| 2016/0080397 A1* | 3/2016 | Bacastow | H04L 63/1433 726/1 |
| 2016/0094528 A1* | 3/2016 | Gordon | H04L 51/00 709/245 |
| 2016/0100346 A1* | 4/2016 | Hall | H04L 45/74 370/315 |
| 2016/0105425 A1* | 4/2016 | Clausen | G06Q 50/265 726/6 |

(56) References Cited

U.S. PATENT DOCUMENTS

| | | | |
|---|---|---|---|
| 2016/0110433 A1* | 4/2016 | Sawhney | G06F 40/30 707/722 |
| 2016/0119424 A1* | 4/2016 | Kane | G08B 25/08 709/203 |
| 2016/0134633 A1* | 5/2016 | Gaddam | G06Q 50/01 726/4 |
| 2016/0142509 A1* | 5/2016 | Shen | G06F 21/305 726/19 |
| 2016/0142532 A1* | 5/2016 | Bostick | H04W 12/06 455/411 |
| 2016/0154982 A1* | 6/2016 | Velusamy | H04L 63/20 455/411 |
| 2016/0164880 A1* | 6/2016 | Colesa | G06F 21/53 726/1 |
| 2016/0164904 A1* | 6/2016 | Alamuri | H04L 63/08 726/25 |
| 2016/0173593 A1* | 6/2016 | Kesavan | G06F 16/181 709/204 |
| 2016/0174031 A1* | 6/2016 | Smith | H04W 4/021 455/456.1 |
| 2016/0241532 A1* | 8/2016 | Loughlin-McHugh | H04W 12/068 |
| 2016/0246989 A1* | 8/2016 | Roy | H04L 63/102 |
| 2016/0253521 A1* | 9/2016 | Esmailzadeh | G06F 21/602 726/4 |
| 2016/0253907 A1* | 9/2016 | Taveira | G05D 1/102 701/3 |
| 2016/0261698 A1* | 9/2016 | Thompson | G06Q 30/0631 |
| 2016/0277383 A1* | 9/2016 | Guyomarc'h | H04L 63/0853 |
| 2016/0277395 A1* | 9/2016 | Palzón Romero | H04L 63/0428 |
| 2016/0277396 A1* | 9/2016 | Gardiner | G06Q 20/40 |
| 2016/0285551 A1* | 9/2016 | Mateti | H04B 10/1129 |
| 2016/0285893 A1* | 9/2016 | Childress | H04L 63/04 |
| 2016/0294845 A1* | 10/2016 | Jackson | H04L 63/08 |
| 2016/0307196 A1* | 10/2016 | Achhra | G06Q 20/3821 |
| 2016/0307286 A1* | 10/2016 | Miasnik | H04W 4/029 |
| 2016/0316723 A1* | 11/2016 | Wall | A01K 11/008 |
| 2016/0321652 A1* | 11/2016 | Dimmick | H04L 63/083 |
| 2016/0328707 A1* | 11/2016 | Wagner | G06Q 20/322 |
| 2016/0330183 A1* | 11/2016 | McDowell | H04L 63/10 |
| 2016/0337346 A1* | 11/2016 | Momchilov | G06F 21/34 |
| 2016/0337353 A1* | 11/2016 | Coats | H04W 12/06 |
| 2016/0337369 A1* | 11/2016 | Sanso | H04L 63/0807 |
| 2016/0343093 A1* | 11/2016 | Riland | G06Q 50/06 |
| 2016/0352867 A1* | 12/2016 | Subbarayan | H04L 41/28 |
| 2016/0364163 A1* | 12/2016 | Kamble | H04L 63/105 |
| 2016/0379013 A1* | 12/2016 | Ganesan | G06F 21/645 713/176 |
| 2016/0379220 A1* | 12/2016 | Tunnell | H04W 12/068 705/71 |
| 2017/0041146 A1* | 2/2017 | Davis | H04L 9/0872 |
| 2017/0041388 A1* | 2/2017 | Tal | G06Q 50/01 |
| 2017/0046506 A1* | 2/2017 | Fujii | H04L 63/08 |
| 2017/0048275 A1* | 2/2017 | John | G06F 21/6227 |
| 2017/0054734 A1* | 2/2017 | Sigal | G06Q 10/06398 |
| 2017/0063755 A1* | 3/2017 | Pulfer | G09G 5/00 |
| 2017/0063840 A1* | 3/2017 | Krishnaiah | H04L 63/0861 |
| 2017/0070500 A1* | 3/2017 | Hockey | H04L 63/0807 |
| 2017/0078259 A1* | 3/2017 | Kumar | H04L 67/59 |
| 2017/0083901 A1* | 3/2017 | Spencer, II | G06Q 30/0267 |
| 2017/0091757 A1* | 3/2017 | Lloyd | G06Q 20/12 |
| 2017/0093481 A1* | 3/2017 | Cannon | H04W 4/90 |
| 2017/0093817 A1* | 3/2017 | Khoury | H04L 9/3073 |
| 2017/0093878 A1* | 3/2017 | Rodniansky | G06F 21/85 |
| 2017/0099344 A1* | 4/2017 | Hadfield | H04L 63/20 |
| 2017/0104756 A1* | 4/2017 | Rosenthal | H04L 63/20 |
| 2017/0104833 A1* | 4/2017 | Suri | H04L 67/12 |
| 2017/0111365 A1* | 4/2017 | Michael | G06F 9/545 |
| 2017/0118201 A1* | 4/2017 | Hoyer | H04L 63/0815 |
| 2017/0118214 A1* | 4/2017 | Vainstein | H04L 63/10 |
| 2017/0126660 A1* | 5/2017 | Brannon | H04L 63/0823 |
| 2017/0126661 A1* | 5/2017 | Brannon | H04L 63/0815 |
| 2017/0126681 A1* | 5/2017 | Barrett | H04L 9/3226 |
| 2017/0132186 A1* | 5/2017 | Plummer | G06F 21/6227 |
| 2017/0134392 A1* | 5/2017 | Chattopadhyay | G06F 8/60 |
| 2017/0142128 A1* | 5/2017 | McCormack | H04L 63/108 |
| 2017/0142562 A1* | 5/2017 | Stewart | H04W 4/12 |
| 2017/0147795 A1* | 5/2017 | Sardesai | G06F 21/41 |
| 2017/0161443 A1* | 6/2017 | Bassham | G16H 40/20 |
| 2017/0163652 A1* | 6/2017 | Peppe | G06F 21/606 |
| 2017/0163654 A1* | 6/2017 | Peppe | H04L 63/101 |
| 2017/0163655 A1* | 6/2017 | Ramalingam | H04W 48/04 |
| 2017/0171183 A1* | 6/2017 | Lingappa | H04L 63/0435 |
| 2017/0178420 A1* | 6/2017 | Byrd, Jr. | G07C 5/0841 |
| 2017/0180343 A1* | 6/2017 | De Ganon | G06Q 20/4014 |
| 2017/0187700 A1* | 6/2017 | Rangaraj | H04L 63/08 |
| 2017/0195386 A1* | 7/2017 | Nathan | H04N 23/617 |
| 2017/0195879 A1* | 7/2017 | Jones-McFadden | G06Q 20/36 |
| 2017/0201518 A1* | 7/2017 | Holmqvist | H04L 63/10 |
| 2017/0220012 A1* | 8/2017 | Hart | H04L 67/12 |
| 2017/0220813 A1* | 8/2017 | Mullins | G06F 16/93 |
| 2017/0221059 A1* | 8/2017 | Sethi | G06Q 20/3224 |
| 2017/0223026 A1* | 8/2017 | Amiri | H04L 63/20 |
| 2017/0223057 A1* | 8/2017 | Amiri | H04L 67/306 |
| 2017/0236347 A1* | 8/2017 | Drako | G07C 9/23 340/5.33 |
| 2017/0243195 A1* | 8/2017 | Xing | G06Q 20/0855 |
| 2017/0255932 A1* | 9/2017 | Aabye | G06Q 20/38215 |
| 2017/0257379 A1* | 9/2017 | Weintraub | H04L 63/107 |
| 2017/0262833 A1* | 9/2017 | Xing | G06Q 30/0226 |
| 2017/0263130 A1* | 9/2017 | Sane | G08G 5/0039 |
| 2017/0264681 A1* | 9/2017 | Apte | H04W 12/08 |
| 2017/0280107 A1* | 9/2017 | Wood | G06Q 50/01 |
| 2017/0302459 A1* | 10/2017 | Fenner | H04L 9/3234 |
| 2017/0315790 A1* | 11/2017 | Samatov | G06F 8/60 |
| 2017/0316418 A1* | 11/2017 | Sarin | H04W 4/24 |
| 2017/0324750 A1* | 11/2017 | Khan | H04W 12/068 |
| 2017/0331828 A1* | 11/2017 | Caldera | H04L 63/0807 |
| 2017/0331901 A1* | 11/2017 | Sarlandie de la Robertie | G06F 1/163 |
| 2017/0346804 A1* | 11/2017 | Beecham | H04L 63/08 |
| 2017/0346851 A1* | 11/2017 | Drake | H04L 9/0838 |
| 2017/0351855 A1* | 12/2017 | Allen | G06F 21/604 |
| 2017/0353445 A1* | 12/2017 | Steeves | H04L 9/3247 |
| 2017/0353458 A1* | 12/2017 | Lipke | H04L 63/08 |
| 2017/0363774 A1* | 12/2017 | Jiang | G08G 1/0967 |
| 2017/0366443 A1* | 12/2017 | Fouad | H04L 43/10 |
| 2017/0366547 A1* | 12/2017 | Goldfarb | H04L 63/10 |
| 2017/0372080 A1* | 12/2017 | Gordon | G06F 21/604 |
| 2018/0005072 A1* | 1/2018 | Justice | G06V 10/462 |
| 2018/0026984 A1* | 1/2018 | Maker | H04L 63/102 726/4 |
| 2018/0039771 A1* | 2/2018 | Konstantinov | H04L 63/08 |
| 2018/0048631 A1* | 2/2018 | Waltermann | H04L 63/06 |
| 2018/0048735 A1* | 2/2018 | Drouin | H04L 67/52 |
| 2018/0059660 A1* | 3/2018 | Heatzig | B64C 39/024 |
| 2018/0063709 A1* | 3/2018 | Morrison | H04W 12/069 |
| 2018/0075229 A1* | 3/2018 | Jan | G06F 21/35 |
| 2018/0089320 A1* | 3/2018 | Hanson | G06F 16/9535 |
| 2018/0089449 A1* | 3/2018 | Boudreau | H04L 63/0227 |
| 2018/0089916 A1* | 3/2018 | Drako | G07C 9/00571 |
| 2018/0096153 A1* | 4/2018 | DeWitte | G06F 21/552 |
| 2018/0097790 A1* | 4/2018 | Caldera | H04L 63/08 |
| 2018/0109430 A1* | 4/2018 | Quintas | H04L 43/04 |
| 2018/0109507 A1* | 4/2018 | Caldera | H04L 63/08 |
| 2018/0114361 A1* | 4/2018 | Carrington | H04W 4/90 |
| 2018/0115551 A1* | 4/2018 | Cole | H04L 47/783 |
| 2018/0121683 A1* | 5/2018 | Goldberg | H04L 63/0853 |
| 2018/0123794 A1* | 5/2018 | Goranov | H04L 9/30 |
| 2018/0131684 A1* | 5/2018 | Standefer, III | H04L 63/104 |
| 2018/0131726 A1* | 5/2018 | Arumugam | H04L 63/101 |
| 2018/0137199 A1* | 5/2018 | Miller | G06Q 50/01 |
| 2018/0139049 A1* | 5/2018 | Goranov | H04L 9/3247 |
| 2018/0144178 A1* | 5/2018 | Han | H04L 9/3231 |
| 2018/0146046 A1* | 5/2018 | Deane | H04L 41/22 |
| 2018/0146371 A1* | 5/2018 | Albanese | H04W 4/021 |
| 2018/0150892 A1* | 5/2018 | Waldron | G06Q 30/0631 |
| 2018/0150899 A1* | 5/2018 | Waldron | G06F 3/017 |
| 2018/0152845 A1* | 5/2018 | Unnerstall | G06Q 20/3224 |
| 2018/0159838 A1* | 6/2018 | Dintenfass | G06F 3/14 |
| 2018/0162501 A1* | 6/2018 | Peterson | G01N 33/18 |
| 2018/0165781 A1* | 6/2018 | Rodriguez | G06F 21/34 |
| 2018/0176017 A1* | 6/2018 | Rodriguez | H04L 63/20 |

(56) References Cited

U.S. PATENT DOCUMENTS

| | | | |
|---|---|---|---|
| 2018/0191733 A1* | 7/2018 | Kundu | G06F 9/5077 |
| 2018/0204399 A1* | 7/2018 | Newman | G07C 9/28 |
| 2018/0212975 A1* | 7/2018 | Bandi | H04L 63/0428 |
| 2018/0218057 A1* | 8/2018 | Beckham | G06F 40/106 |
| 2018/0219683 A1* | 8/2018 | Deery | H04L 9/3239 |
| 2018/0234351 A1* | 8/2018 | Amento | H04L 12/18 |
| 2018/0241480 A1* | 8/2018 | Hughes | G06N 10/00 |
| 2018/0248887 A1* | 8/2018 | Sayed | H04L 63/105 |
| 2018/0255211 A1* | 9/2018 | Kniffen | G06V 10/82 |
| 2018/0262510 A1* | 9/2018 | Su | G06F 21/6218 |
| 2018/0262907 A1* | 9/2018 | Alanis | H04W 12/64 |
| 2018/0276395 A1* | 9/2018 | Bostick | H04L 63/0861 |
| 2018/0276666 A1* | 9/2018 | Haldenby | H04L 9/3268 |
| 2018/0288031 A1* | 10/2018 | Kumar | H04L 63/0807 |
| 2018/0290748 A1* | 10/2018 | Corban | G02B 27/017 |
| 2018/0293373 A1* | 10/2018 | Johnson | G06F 21/6218 |
| 2018/0300678 A1* | 10/2018 | Drako | G07C 9/00571 |
| 2018/0303003 A1* | 10/2018 | Meinhart | H05K 7/20772 |
| 2018/0313975 A1* | 11/2018 | Chen | G01W 1/10 |
| 2018/0316665 A1* | 11/2018 | Caldera | H04L 63/104 |
| 2018/0324163 A1* | 11/2018 | Dumanois | H04L 63/08 |
| 2018/0336069 A1* | 11/2018 | Soni | H04L 63/08 |
| 2018/0337795 A1* | 11/2018 | Katrak | H04L 63/104 |
| 2018/0343246 A1* | 11/2018 | Benayed | H04L 9/3226 |
| 2018/0343257 A1* | 11/2018 | Frankel | H04L 63/20 |
| 2018/0349920 A1* | 12/2018 | Katib | G06Q 30/0185 |
| 2018/0349938 A1* | 12/2018 | Ericson | H04L 63/123 |
| 2018/0375847 A1* | 12/2018 | Schropfer | H04L 63/08 |
| 2019/0007398 A1* | 1/2019 | Jaladi | H04L 63/0853 |
| 2019/0014097 A1* | 1/2019 | Hwang | H04L 63/08 |
| 2019/0014118 A1* | 1/2019 | Pugh | H04L 63/0853 |
| 2019/0020478 A1* | 1/2019 | Girish | H04L 9/3271 |
| 2019/0034602 A1* | 1/2019 | Votaw | H04W 12/06 |
| 2019/0036887 A1* | 1/2019 | Miller | G07C 9/20 |
| 2019/0036938 A1* | 1/2019 | Sander | H04L 63/1441 |
| 2019/0037370 A1* | 1/2019 | Beller | H04W 4/023 |
| 2019/0067812 A1* | 2/2019 | Abuasabeh | H04W 4/029 |
| 2019/0081958 A1* | 3/2019 | Lee | H04L 63/145 |
| 2019/0089688 A1* | 3/2019 | Rathineswaran | H04L 63/105 |
| 2019/0089757 A1* | 3/2019 | Sorensen | G06F 21/62 |
| 2019/0094051 A1* | 3/2019 | Hoffmann | H04Q 9/00 |
| 2019/0098505 A1* | 3/2019 | Mars | H04L 63/102 |
| 2019/0109713 A1* | 4/2019 | Clark | G06F 16/182 |
| 2019/0114549 A1* | 4/2019 | Olsher | G06N 5/02 |
| 2019/0116163 A1* | 4/2019 | Bolotov | H04L 63/0853 |
| 2019/0116187 A1* | 4/2019 | Gahnoog | H04L 67/10 |
| 2019/0123901 A1* | 4/2019 | Vijayanarayanan | H04L 9/0872 |
| 2019/0130123 A1* | 5/2019 | Ben-Yair | G06F 21/606 |
| 2019/0138747 A1* | 5/2019 | Anderson | G06F 21/6254 |
| 2019/0141021 A1* | 5/2019 | Isaacson | G06Q 30/0635 |
| 2019/0141026 A1* | 5/2019 | Kshirsagar | H04L 63/123 |
| 2019/0149547 A1* | 5/2019 | Dubodelov | G06F 3/04842 726/4 |
| 2019/0158492 A1* | 5/2019 | Zavesky | G06F 21/62 |
| 2019/0166159 A1* | 5/2019 | Avrahami | H04L 63/1483 |
| 2019/0171832 A1* | 6/2019 | Dowlatkhah | G06F 21/6218 |
| 2019/0208420 A1* | 7/2019 | Lekkas | H04W 12/08 |
| 2019/0219703 A1* | 7/2019 | Schreib | G01S 5/0072 |
| 2019/0228429 A1* | 7/2019 | Mottur | G06Q 30/0601 |
| 2019/0230070 A1* | 7/2019 | Isaacson | H04W 12/084 |
| 2019/0239043 A1* | 8/2019 | Palin | H04L 67/53 |
| 2019/0244485 A1* | 8/2019 | Jones | G07F 17/3274 |
| 2019/0247741 A1* | 8/2019 | Arias | A63F 3/00697 |
| 2019/0248328 A1* | 8/2019 | Eriksen | G07C 9/00309 |
| 2019/0253130 A1* | 8/2019 | Bagnall | G08G 3/02 |
| 2019/0260586 A1* | 8/2019 | Wu | H04L 9/0827 |
| 2019/0260725 A1* | 8/2019 | Moran | H04L 63/08 |
| 2019/0268332 A1* | 8/2019 | Wang | G06F 21/62 |
| 2019/0274046 A1* | 9/2019 | Lierman | H04L 63/107 |
| 2019/0281030 A1* | 9/2019 | Isaacson | H04L 63/0838 |
| 2019/0281066 A1* | 9/2019 | Simons | G06F 21/6254 |
| 2019/0303552 A1* | 10/2019 | Houseworth | G06F 21/32 |
| 2019/0303909 A1* | 10/2019 | De la Torre | G06Q 20/351 |
| 2019/0306224 A1* | 10/2019 | Nuggehalli | G06F 9/468 |
| 2019/0311147 A1* | 10/2019 | Gollogly | H04L 9/50 |
| 2019/0312733 A1* | 10/2019 | Engan | H04L 63/126 |
| 2019/0318119 A1* | 10/2019 | Anneboina | G06F 16/2358 |
| 2019/0318122 A1* | 10/2019 | Hockey | G06Q 20/3221 |
| 2019/0318333 A1* | 10/2019 | Castinado | G06Q 20/16 |
| 2019/0319945 A1* | 10/2019 | Levy | H04L 41/22 |
| 2019/0324456 A1* | 10/2019 | Ryan | G06F 9/4806 |
| 2019/0325654 A1* | 10/2019 | Stisser | A63F 13/26 |
| 2019/0332795 A1* | 10/2019 | Woodward | G06Q 10/087 |
| 2019/0340369 A1* | 11/2019 | Hadi | G06V 40/33 |
| 2019/0342759 A1* | 11/2019 | Mahaffey | H04M 15/58 |
| 2019/0378364 A1* | 12/2019 | Drako | G07C 9/21 |
| 2019/0379673 A1* | 12/2019 | Coonrod | H04L 9/50 |
| 2019/0394041 A1* | 12/2019 | Jain | H04L 9/3247 |
| 2020/0007316 A1* | 1/2020 | Krishnamacharya | H04L 9/3231 |
| 2020/0007333 A1* | 1/2020 | Young | H04L 9/50 |
| 2020/0028841 A1* | 1/2020 | Mars | G06Q 20/308 |
| 2020/0036708 A1* | 1/2020 | Mars | H04L 63/107 |
| 2020/0036709 A1* | 1/2020 | Mars | H04L 63/0853 |
| 2020/0042837 A1* | 2/2020 | Skinner | H04L 63/102 |
| 2020/0042971 A1* | 2/2020 | Eby | G06Q 20/401 |
| 2020/0051115 A1* | 2/2020 | Lawrence | H04L 9/3213 |
| 2020/0052896 A1* | 2/2020 | Acharya | H04L 9/3213 |
| 2020/0058023 A1* | 2/2020 | Travizano | H04L 9/3239 |
| 2020/0067918 A1* | 2/2020 | Brachetti | G06F 21/32 |
| 2020/0074105 A1* | 3/2020 | Gordon | G06F 21/6209 |
| 2020/0082728 A1* | 3/2020 | Buchanan | G06Q 30/08 |
| 2020/0089680 A1* | 3/2020 | Mital | H04L 63/166 |
| 2020/0092285 A1* | 3/2020 | Graham | H04L 63/18 |
| 2020/0093403 A1* | 3/2020 | De La Fuente Sanchez | H04L 63/0807 |
| 2020/0097679 A1* | 3/2020 | Fisse | G06F 16/27 |
| 2020/0104519 A1* | 4/2020 | Farber | H04L 63/0807 |
| 2020/0106766 A1* | 4/2020 | Suraparaju | H04L 9/3226 |
| 2020/0112557 A1* | 4/2020 | McCullough, IV | H04L 9/50 |
| 2020/0112589 A1* | 4/2020 | Chauhan | H04W 12/02 |
| 2020/0117472 A1* | 4/2020 | Willoughby | G06F 9/4408 |
| 2020/0117605 A1* | 4/2020 | Cornett | H04L 49/9047 |
| 2020/0128395 A1* | 4/2020 | Mars | H04W 12/35 |
| 2020/0128396 A1* | 4/2020 | Mars | H04W 12/50 |
| 2020/0134219 A1* | 4/2020 | Dhanabalan | G06F 16/176 |
| 2020/0134750 A1* | 4/2020 | Wolf | G06F 3/04847 |
| 2020/0137041 A1* | 4/2020 | DeGennaro | G06F 21/31 |
| 2020/0145816 A1* | 5/2020 | Morin | H04W 56/001 |
| 2020/0159946 A1* | 5/2020 | Castinado | H04L 63/08 |
| 2020/0162432 A1* | 5/2020 | Ludin | H04L 63/0807 |
| 2020/0169567 A1* | 5/2020 | Queen | G06F 21/6218 |
| 2020/0177576 A1* | 6/2020 | Vudathu | H04L 63/0815 |
| 2020/0177606 A1* | 6/2020 | Valluri | H04L 63/1416 |
| 2020/0186520 A1* | 6/2020 | Oberheide | G06Q 20/356 |
| 2020/0195618 A1* | 6/2020 | Linton | H04L 63/0407 |
| 2020/0195656 A1* | 6/2020 | Marsh | H04L 63/107 |
| 2020/0201964 A1* | 6/2020 | Nandakumar | H04L 63/0861 |
| 2020/0202036 A1* | 6/2020 | Baruch | H04L 63/101 |
| 2020/0204358 A1* | 6/2020 | Nandakumar | H04L 9/3236 |
| 2020/0213114 A1* | 7/2020 | Sarin | H04L 9/3213 |
| 2020/0213292 A1* | 7/2020 | Cage | H04L 63/10 |
| 2020/0213319 A1* | 7/2020 | Bowie | H04L 63/108 |
| 2020/0213329 A1* | 7/2020 | Simons | H04L 9/3297 |
| 2020/0234014 A1* | 7/2020 | Swallow | H04W 4/021 |
| 2020/0236607 A1* | 7/2020 | Zhu | H04W 40/26 |
| 2020/0242232 A1* | 7/2020 | Machani | H04L 63/0884 |
| 2020/0244464 A1* | 7/2020 | McLean | H04L 9/0618 |
| 2020/0250719 A1* | 8/2020 | Shah | G06Q 30/0605 |
| 2020/0252400 A1* | 8/2020 | Pike | H04L 63/0884 |
| 2020/0279255 A1* | 9/2020 | Douglas | H04L 63/0876 |
| 2020/0288308 A1* | 9/2020 | Jimenez | H04W 12/33 |
| 2020/0296093 A1* | 9/2020 | Hoyos | H04L 9/3247 |
| 2020/0314068 A1* | 10/2020 | Werner | G06F 40/166 |
| 2020/0320204 A1* | 10/2020 | Venable, Sr. | G06F 21/64 |
| 2020/0320211 A1* | 10/2020 | Moore | H04L 63/04 |
| 2020/0327550 A1* | 10/2020 | Yamane | H04L 67/125 |
| 2020/0329018 A1* | 10/2020 | Tali | G06F 21/32 |
| 2020/0334588 A1* | 10/2020 | Colon | H04W 12/084 |
| 2020/0351657 A1* | 11/2020 | Wentz | H04L 9/3231 |
| 2020/0356774 A1* | 11/2020 | Korn | H04N 7/181 |
| 2020/0364358 A1* | 11/2020 | Karia | G06Q 20/3829 |
| 2020/0364720 A1* | 11/2020 | Lally | G06Q 20/4037 |

(56) References Cited

U.S. PATENT DOCUMENTS

| | | | |
|---|---|---|---|
| 2020/0366669 A1* | 11/2020 | Gupta | G06K 19/06028 |
| 2020/0371764 A1* | 11/2020 | Sousa | H04L 63/0815 |
| 2020/0374267 A1* | 11/2020 | Shepard | G06F 16/245 |
| 2020/0374697 A1* | 11/2020 | Higley | G05B 19/042 |
| 2020/0377234 A1* | 12/2020 | Catledge | G08G 5/0091 |
| 2020/0387904 A1* | 12/2020 | Gosalia | H04L 63/0428 |
| 2020/0389319 A1* | 12/2020 | Wise | H04L 63/123 |
| 2020/0395104 A1* | 12/2020 | Raul | H04L 67/303 |
| 2020/0412731 A1* | 12/2020 | Gulbrandsen | H04L 9/3247 |
| 2021/0004463 A1* | 1/2021 | Todasco | G06F 21/565 |
| 2021/0004486 A1* | 1/2021 | Adams | G06F 21/604 |
| 2021/0011957 A1* | 1/2021 | Lenzner | G06F 16/9566 |
| 2021/0019434 A1* | 1/2021 | Bibliowicz | G06F 16/90335 |
| 2021/0021423 A1* | 1/2021 | Latorre | G06Q 10/10 |
| 2021/0029107 A1* | 1/2021 | Parkinson | H04L 63/0869 |
| 2021/0029132 A1* | 1/2021 | Wilczynski | G06F 21/6227 |
| 2021/0029163 A1* | 1/2021 | Behl | H04L 41/0843 |
| 2021/0044597 A1* | 2/2021 | Rahman | G06Q 10/10 |
| 2021/0056236 A1* | 2/2021 | Russinovich | H04L 63/14 |
| 2021/0058377 A1* | 2/2021 | Khan | G06Q 10/107 |
| 2021/0075613 A1* | 3/2021 | Pandey | H04L 9/0637 |
| 2021/0075794 A1* | 3/2021 | Gazit | H04L 63/1408 |
| 2021/0075832 A1* | 3/2021 | Bisztrai | H04L 65/1069 |
| 2021/0092604 A1* | 3/2021 | Fox | H04W 12/08 |
| 2021/0094703 A1* | 4/2021 | Catledge | B64G 1/242 |
| 2021/0097118 A1* | 4/2021 | Cudak | H04L 63/102 |
| 2021/0097166 A1* | 4/2021 | Arora | G06F 21/32 |
| 2021/0097188 A1* | 4/2021 | Findlay | G06F 16/335 |
| 2021/0097189 A1* | 4/2021 | Miller | G06F 21/53 |
| 2021/0097542 A1* | 4/2021 | Khan | H04W 12/122 |
| 2021/0125109 A1* | 4/2021 | Handler | G06Q 50/12 |
| 2021/0136111 A1* | 5/2021 | Russinovich | H04L 63/18 |
| 2021/0168181 A1* | 6/2021 | Sevim | H04L 67/1097 |
| 2021/0174355 A1* | 6/2021 | Gupta | G06Q 20/351 |
| 2021/0179073 A1* | 6/2021 | Todor | H04W 4/40 |
| 2021/0185526 A1* | 6/2021 | Grewal | H04W 12/63 |
| 2021/0209202 A1* | 7/2021 | Dande | H04L 63/08 |
| 2021/0211289 A1* | 7/2021 | Lin | H04L 9/3213 |
| 2021/0211430 A1* | 7/2021 | Dande | G06F 9/3891 |
| 2021/0218773 A1* | 7/2021 | Prakash | H04L 67/5682 |
| 2021/0226794 A1* | 7/2021 | Axdorff | H04W 12/084 |
| 2021/0233383 A1* | 7/2021 | Roark | H04L 49/35 |
| 2021/0286857 A1* | 9/2021 | Guillon | G06F 16/9577 |
| 2021/0288808 A1* | 9/2021 | Bahety | H04L 9/3247 |
| 2021/0289047 A1* | 9/2021 | Pathak | H04L 63/0815 |
| 2021/0289576 A1* | 9/2021 | Cheaz | A61B 5/747 |
| 2021/0295851 A1* | 9/2021 | Merkel | H04L 63/20 |
| 2021/0297406 A1* | 9/2021 | Landers | H04L 63/0853 |
| 2021/0306344 A1* | 9/2021 | Han | H04L 63/08 |
| 2021/0319639 A1* | 10/2021 | Ho | G06F 21/31 |
| 2021/0342480 A1* | 11/2021 | Kogan | G06F 16/156 |
| 2021/0352134 A1* | 11/2021 | Bjontegard | H04W 12/009 |
| 2021/0365968 A1* | 11/2021 | Narula | G06Q 30/0201 |
| 2021/0374485 A1* | 12/2021 | Pilcher | G06V 10/40 |
| 2021/0377240 A1* | 12/2021 | Beemer | H04L 63/107 |
| 2022/0076556 A1* | 3/2022 | Lindenau | H04M 11/04 |
| 2022/0078281 A1* | 3/2022 | Lindenau | H04M 3/5183 |
| 2022/0086132 A1* | 3/2022 | Tesson | H04L 63/0815 |
| 2022/0091289 A1* | 3/2022 | Tinker | G01V 1/30 |
| 2022/0130264 A1* | 4/2022 | Krawiec | G07C 5/0808 |
| 2022/0157178 A1* | 5/2022 | Grace | G01C 21/3833 |
| 2022/0197236 A1* | 6/2022 | Krawiec | H04L 41/0803 |
| 2022/0252718 A1* | 8/2022 | Nohara | G01S 13/878 |
| 2022/0286845 A1* | 9/2022 | Vanoss | H04L 9/3271 |
| 2023/0006988 A1* | 1/2023 | Menth | H04L 63/20 |
| 2023/0049550 A1* | 2/2023 | Roy | G06F 18/214 |
| 2023/0056136 A1* | 2/2023 | Webber | G06Q 50/26 |
| 2023/0109545 A1* | 4/2023 | Wilkerson | H04L 9/3263 713/175 |
| 2023/0111177 A1* | 4/2023 | Noel | H04L 63/1433 726/23 |
| 2023/0342776 A1* | 10/2023 | O'Kane | G06Q 20/204 |

OTHER PUBLICATIONS

Khokhlov "Integrated Framework for Data Quality and Security Evaluation on Mobile Devices," Dissertation, Rochester Institute of Technology, Rochester, New York, Jun. 1, 2020, pp. 1-199. (Year: 2020).*

Balfour Next Generation Emergency Management Common Operating Picture Softwaer/Systems (COPSS), IEEE pp. 1-6 (Year: 2012).*

Laaperi et al "Architecture for a System Providing a Common Operating Picture of Critical Infrastructure," IEEE, pp. 1-6 (Year: 2015).*

Conti et al "Towards a Cyber Common Operating Picture," 2013 5th International Conference on Cyber Conflict, pp. 1-17 (Year: 2013).*

Wang et al "Google Patents Translation of CN105791259A," pp. 1-10 (Year: 2016).*

Robertson "Integrity of a Common Operating Picture in Military Situational Awareness," IEEE, pp. 1-7 (Year: 2014).*

Robertson et al "Integrity of a Common Operating Picture in Military Situational Awareness," IEEE, pp. 1-7 (Year: 2014).*

Balfour "Next Generation Emergency Management Common Operating Picture Software/Systems (COPSS)," IEEE, pp. 1-6 (Year: 2012).*

Dahnert "HawkEyes: An Advanced IP Geolocation Approach," IP Geolocation Using Semantic and Measurement Based Techniques, EWI, pp. 1-3 (Year: 2011).*

Yu et al "Digital Signature Based on User Role Token and Its Application in E-Government," IEEE Computer Society, pp. 279-282 (Year: 2009).*

* cited by examiner

SYSTEM AND METHODS FOR TOKENIZED HIERARCHICAL SECURED ASSET DISTRIBUTION

FIELD OF DISCLOSURE

The present disclosure generally relates to distributing data, and more specifically to distributing data to users in a secured computing environment.

BACKGROUND

Governments use classification systems to prevent unauthorized people from accessing sensitive information. Many governments use a classification system that has hierarchical classification levels such as, for example in ascending order, confidential, secret, top secret.

These security classifications are given to sensitive information and are also given to personnel. A person with a security clearance may only access information that is equal to or below the security clearance that they hold. However, the security clearance is not the only requirement for accessing secured information. In order to access information, a person must have not only the proper clearance classification, but they also must have a need to know the requested information.

Such a scheme limits the dissemination of classified information. For example, a commander with a top-secret clearance who is operating in the Asian theater may have access to all of the information relevant to Asia at the top-secret, secret, and confidential security levels. However, this commander, though he has a top-secret clearance, may not have access to the top secret movements of an aircraft carrier in Europe because he does not need to know the aircraft carrier movements in Europe to perform his duty in Asia.

In a decentralized, highly dynamic, digital operating environment where many entities have large databases with classified information, it is challenging for users to fully and efficiently access the desired information.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

In one aspect, the present disclosure relates to a method comprising: receiving a request from a user interface, the user interface operative to receive an input from a user, the input comprising the following: a data request, and a security clearance level; verifying, the security clearance level; analyzing at least one security clearance level associated with each portion of the data request; retrieving at least one data element from at least one external database, the at least one data element being associated with the data request; parsing the at least one data element, the parsing comprising: extracting at least a portion of the at least one data element in accordance with the following: relevance to the data request, and the verified security clearance level, and redacting at least a portion of the at least one data element in accordance with the following: relevance to the data request, and the verified security clearance level; generating a report, the report comprising: the parsed at least one data element, a security layer, and a common operating picture; and transmitting the report to the user.

In another aspect, the present disclosure relates to a method comprising: receiving a request from a user device, the user device operative to receive an input from a user, the input comprising the following: a data request and a security clearance level; verifying the security clearance level in accordance with the user; analyzing at least one security clearance level associated with each portion of the data request; locating at least one data element located in at least one external database, the at least one data element being associated with the data request; parsing the at least one data element, the parsing comprising; determining an allowance of access to at least a portion of the at least one data element in accordance with the following: relevance to the data request, and the verified security clearance level of the user, generating a token, the token being configured to allow access at least one data element, the token comprising a security layer in accordance with the parsing of the at least one data element; and transmitting the token to the user device.

In another aspect, the present disclosure relates to a system comprising: a memory storage in operative communication with a processing module and a user interface module; the user interface module configured to perform the following: receive an input from a user, the user the input comprising the following: a data request, and a security clearance level; and the processing module configured to perform the following: receive the input from the user interface module, verify the security clearance level in accordance with a user of the user interface, analyze at least one security clearance level associated with each portion of the data request, locate at least one data element located in the memory storage, the at least one data element being associated with the data request, parse the at least one data element, the parsing configured to perform the following: determine an allowance of access to at least a portion of the at least one data element in accordance with the following: relevance to the data request, and the verified security clearance level of the user, generate a token, the token being configured to allow access at least one data element, the token comprising a security layer in accordance with the parsing of the at least one data element; and transmit the token to the user device.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
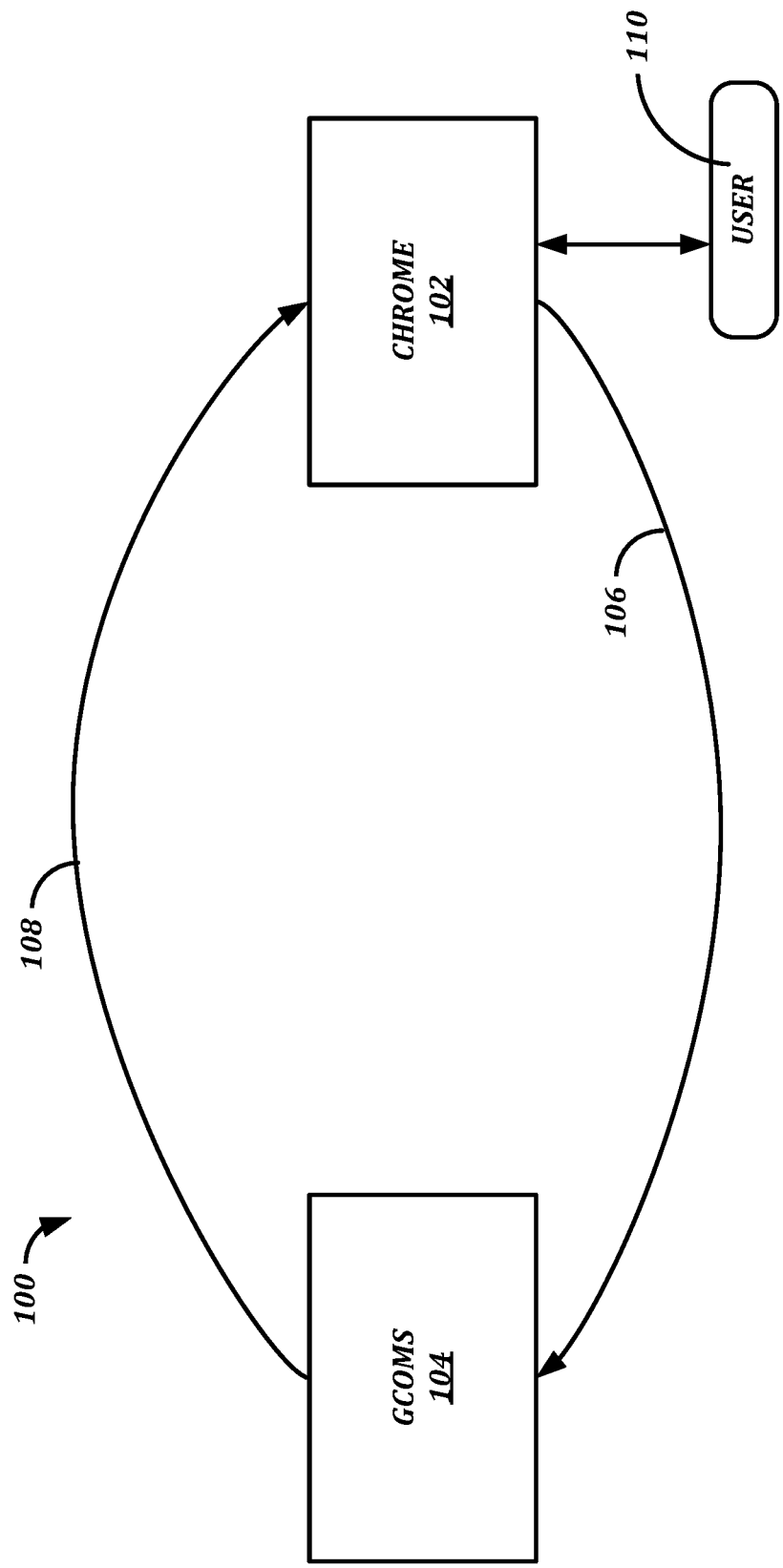
FIG. 1 illustrates a block diagram of a system for tokenized hierarchical secured asset distribution.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list".

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Governments, militaries, and corporations use classification systems to prevent unauthorized people from accessing sensitive information. In this regard, many governments use a classification system that has tiers such as, for example, confidential, secret, and top secret. These security classifications are given to sensitive information and are also given to personnel. A person with a security clearance may only access classified information that has a classification that is at or below the security clearance that they hold. However, the security clearance is not the only requirement for accessing secured information. In order to access classified information, a user should have both a security clearance that corresponds to the classification level of the information and the user should demonstrate that they need to know the classified information as a part of performing their duty.

In practice determining whether the consumer has a security clearance that allows them to access classified sensitive information is straightforward. One compares the security clearance of the consumer with the security classification of the information. For the need to know requirement however, the content of the information (in some examples metadata associated with the information) must be matched to the needs of the individual requesting the information.

The present disclosure includes many aspects and features. Moreover, while many aspects and features relate to, and are described in, the context of data distribution, embodiments of the present disclosure are not limited to use only in this context.

I. System Overview

This overview is provided to introduce a selection of concepts in a simplified form that are further described below. This overview is not intended to identify key features or essential features of the claimed subject matter. Nor is this overview intended to be used to limit the claimed subject matter's scope.

In some embodiments, when accessing sensitive information, a user has a profile or some associative information that may indicate a security clearance level of a user. Determining a "need to know" may be challenging due to a plurality of subjective criteria of the needs of the user being employed.

It is noted that system and/or platform 100 may be in operative communication with and/or embodied as system and/or platform 200, 300, and/or 400.

FIG. 1 illustrates a block diagram of an example of a data distribution system (and/or platform) 100. The system 100 may comprise chrome portion 102 communicatively connected to a global collection operations system management system (GCOMS) 104.

The chrome portion 102 may comprise a defense human enterprise interface capable of parsing visualizations through authorized access and/or a level of security.

By way of nonlimiting example of operation of system 100, the chrome portion 102 may receive a request for information from the user 110 via a user interface. The chrome portion 102 may then send a request 106 to the GCOMS 104 portion of the system 100. The GCOMS 104 portion of the system may then return the extracted data 108.

As discussed above, the GCOMS 104 may not return all of the requested data, but may withhold data if the GCOMS 104 portion determines that the user does not need to know the information. Often, the withheld information may be important for the user to perform their duties and should be included with the search results. Thus, the user may receive incomplete information and may not receive an indication that GCOMS 103 has withheld any of the results due to an apparent lack of a need to know the information.

Such an arrangement may result in undesirable situations where consumers of the information do not receive all of the requested data with the belief that all of the requested data was received.

Details with regards to each module is provided below. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each component disclosed within each module can be considered independently without the context of the other components within the same module or different modules. Each component may contain language defined in other portions of this specifications. Each component disclosed for one module may be mixed with the functionality of another module. In the present disclosure, each component can be claimed on its own and/or interchangeably with other components of other modules.

The following depicts an example of a method of a plurality of methods that may be performed by at least one of the aforementioned modules, or components thereof. Various hardware components may be used at the various stages of operations disclosed with reference to each module. For example, although methods may be described to be performed by a single computing device, it should be understood that, in some embodiments, different operations may be performed by different networked elements in operative communication with the computing device. For example, at least one computing device 500 may be employed in the performance of some or all of the stages disclosed with regard to the methods. Similarly, an apparatus may be employed in the performance of some or all of the stages of the methods. As such, the apparatus may comprise at least those architectural components as found in computing device 500.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Consistent with embodiments of the present disclosure, a method may be performed by at least one of the modules disclosed herein. The method may be embodied as, for example, but not limited to, computer instructions, which when executed, perform the method. The method may comprise the following stages:

receiving a request from a user device, the user device operative to receive an input from a user, the input comprising the following:
  a data request and
  a security clearance level;
verifying the security clearance level in accordance with
  a user of the user interface;
analyzing at least one security clearance level associated
  with each portion of the data request;
locating at least one data element located in at least one
  external database, the at least one data element being
  associated with the data request;
parsing the at least one data element, the parsing comprising:
  determining an allowance of access to at least a portion
    of the at least one data element in accordance with
    the following:
    relevance to the data request, and
    the verified security clearance level of the user,
generating a token, the token being configured to allow
  access at least one data element, the token comprising
  a security layer in accordance with the parsing of the at
  least one data element; and
transmitting the token to the user device.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. System Configuration

Figure 2:
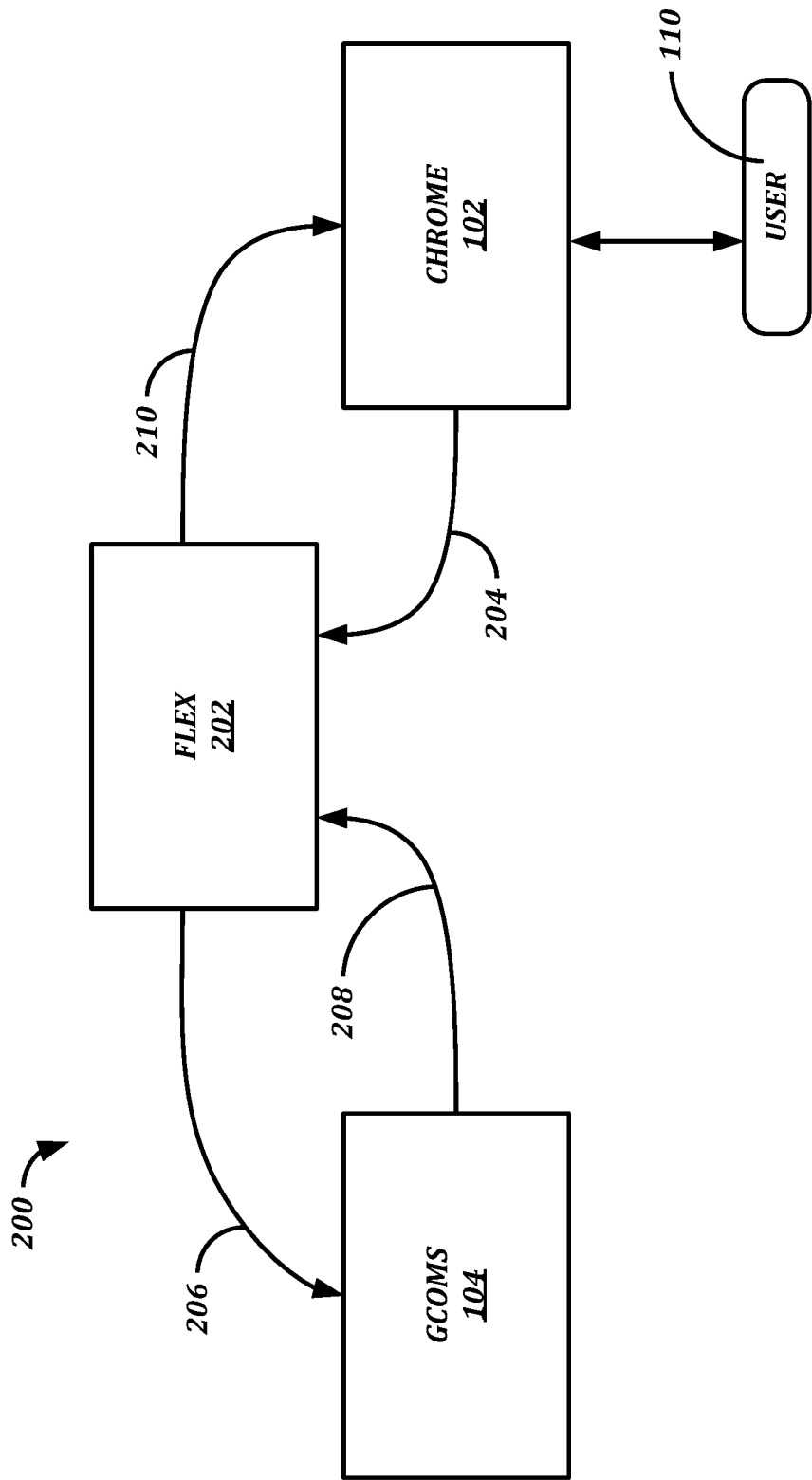
FIG. 2 illustrates a block diagram showing an example operation of the system of FIG. 1.

FIG. 2 illustrates a block diagram of a system 200. The system 200 may comprise a flex portion 202 portion of the system that is communicatively connected to a GCOMS 104 and the chrome portion 102 of the system 200. In some embodiments, the user 110 may interact with the chrome portion 102 to send at least one data request. In further embodiments, the user 110 may interact with the chrome portion 102 to receive at least one result from the GCOMS 104.

In some embodiments, the user 110 may input a request 204 with at least one requirement for information that the chrome portion 102 may send to the flex portion 202.

a. Chrome Portion

FIG. 2 illustrates a chrome portion 102 in accordance with embodiments of the present disclosure. In some embodiments, chrome portion 102 may comprise a Graphical User Interface (GUI) operative to receive an input and/or request from user 110. In further embodiments, chrome portion 102 may comprise a User Interface (UI) operative to receive an input and/or request from user 110. The request and/or input may comprise at least one of the following:
  i. a data request,
  ii. a security clearance level,
  iii. a generation of a request for a common operating picture, and
  iv. a data declassification request.

In some embodiments, the security clearance level may comprise a plurality of hierarchical classification levels.

In some embodiments, the GUI and/or UI may be displayed on at least one user device. The request may comprise, for example, a request for information and/or data from user 110. The at least one user device may be compatible in accordance with computing device 500.

In yet further embodiments, chrome portion 102 may be operative to generate at least one searchable and/or parsable data point from the input and/or request.

In yet further embodiments, chrome portion 102 may be operative to:

a. Flex Portion

FIG. 2 illustrates flex portion 202 in accordance with embodiments of the present disclosure. In some embodiments, flex portion 202 may be configured to receive a request from chrome portion 102.

In further embodiments, flex portion 202 may be configured to verify the security clearance level.

In further embodiments, flex portion 202 may be configured to analyze at least one security clearance level associated with each portion of the data request.

In further embodiments, flex portion 202 may be configured to retrieve at least one data element from at least one external database and/or GCOMS 104. The at least one data element may be associated with at least a portion of the data request.

In further embodiments, flex portion 202 may be configured to parse the at least one data element. In some embodiments, the parsing may comprise extracting at least a portion of the at least one data element. In some embodiments, the extracting may be in accordance with at least one of the following:
  a. relevance to the data request,
  b. the verified security clearance level, and
  c. other factors considered with the data request.

In further embodiments, the parsing may comprise redacting at least a portion of the at least one data element. In some embodiments, the redacting may be in accordance with at least one of the following:
  a. relevance to the data request,
  b. the verified security clearance level, and
  c. other factors considered with the data request.

In further embodiments, flex portion 202 may be configured to determine an allowance of access to at least a portion of the at least one data element.

In some embodiments, flex portion 202 may be configured to compare a geolocation relating to the data request and a geolocation related to the at least one data element.

In some embodiments, flex portion 202 may be configured to redact at least a portion of the at least one data element in accordance with an incongruence of the geolocation relating to the data request and the geolocation related to the at least one data element.

In some embodiments, flex portion 202 may be configured to redact at least a portion of the at least one data element in accordance with a predetermined radius of the geolocation relating to the data request falling outside of a predetermined radius of the geolocation of the least one data element.

In further embodiments, flex portion 202 may be configured to generate a common operating picture. The common operating picture may be used for a plurality of parties to view and/or access relevant (operational) information.

In further embodiments, flex portion 202 may be configured to generate a report. In some embodiments, the report may comprise the parsed at least one data element. In further embodiments, the report may comprise the common operating picture.

In further embodiments, the report may comprise a security layer and/or security protocol.

In further embodiments, flex portion 202 may be configured to generate a token. In some embodiments, the token may comprise at least one of the following to allow access the parsed at least one data element:
  a. a unique access code,
  b. an identifier,
  c. a permission indicator,
  d. a portal,
  e. an operator, and
  f. a string.

In further embodiments, the token may comprise access to the common operating picture.

a. GCOMS

FIG. 2 illustrates GCOMS 104 in accordance with embodiments of the present disclosure. In some embodiments, GCOMS may be embodied as, for example, at least one of the following:
  a. a global collection operations system management system,
  b. a memory storage,
  c. an external database,
  d. an internal database,
  e. software in accordance with at least a portion of computing device 500, and
  f. hardware in accordance with at least a portion of computing device 500.

In further embodiments, at least a portion of GCOMS 104 may comprise a security clearance and/or protocol requirement for access. By way of nonlimiting example, GCOMS 104 may be embodied as a plurality of information stored on a government-owned server comprising a portion of classified information and a portion of unclassified information.

In further embodiments, GCOMS 104 may comprise at least a portion of the at least one data element and/or information relevant to the input and/or request.

GCOMS 104 may be embodied as and/or related to, for example, Global Command and Control System (GCCS). The GCCS is the US Department of Defense's joint command and control (C2) system. The GCCS may be used for providing accurate, complete, and timely information for the operational chain of command for U.S. armed forces. The GCCS may be embodied as a computing device consistent with embodiments of the present disclosure, including but not limited to computing device 500, and/or a combination of hardware, software, common procedures, appropriation, and numerous applications and interfaces making an operational architecture that provides worldwide connectivity with all levels of command. GCCS may incorporate systems that provide at least one of the following:

a. situational awareness,
b. intelligence support,
c. force planning,
d. at least one readiness assessment, and
e. deployment applications.

III. Platform Operation

The Chrome portion 102 may be operative to receive requests for information and/or data from the user 110. The user 110 may input a request (user request) 204 with requirements for information that the chrome portion 102 may send to the flex portion 202.

The flex portion 202 may be operative to receive a user request for an analytic product for a specific intelligence collection requirement. Once the flex portion 202 has processed the user request 204, the flex portion 202 may identify relevant information via security tagging and may send a request 206 for data extraction to GCOMS 104.

Once the flex portion 202 has identified the requested information, the flex portion 202 may extract the requested information 208, from GCOMS 104.

The flex portion 202 may create a security layer and/or a common operating picture (common operational procedure, common operational picture synchronizer, and/or COP) to provide the requested information 210 to the chrome portion 102. The requested information may be accessed and requested by the user via the chrome portion 102 based on the security clearance and access of the user 110. In some embodiments, a common operational picture may be embodied as a single (or multiple) identical display of relevant (operational) information.

Embodiments of the present disclosure provide a hardware and software platform operative by a set of methods and computer-readable media comprising instructions configured to operate the aforementioned modules and computing elements in accordance with the methods. The following depicts an example of at least one method of a plurality of methods that may be performed by at least one of the aforementioned modules. Various hardware components may be used at the various stages of operations disclosed with reference to each module.

For example, although methods may be described to be performed by a single computing device, it should be understood that, in some embodiments, different operations may be performed by different networked elements in operative communication with the computing device. For example, at least one computing device 500 may be employed in the performance of some or all of the stages disclosed with regard to the methods. Similarly, an apparatus may be employed in the performance of some or all of the stages of the methods. As such, the apparatus may comprise at least those architectural components as found in computing device 500.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

A. Method for Accessing Protected Information

Consistent with embodiments of the present disclosure, a method 600 and/or 700 may be performed by at least one of the aforementioned modules. The method 600 and/or 700 may be embodied as, for example, but not limited to, computer instructions, which when executed, perform the method. The method may comprise the following stages:

1. Step 602 and/or 702: receiving a request from a user device (Alternate: user interface), the user device operative to receive an input from a user, the input comprising (at least one of) the following:
   a. a data request
   b. a security clearance level
      i. the security level comprising a plurality of hierarchical classification levels
   c. a generation of a request for a common operating picture
   d. a data declassification request
2. Step 604 and/or 704: verifying the security clearance level in accordance with the user (of the user interface)
3. Step 606 and/or 706: analyzing at least one security clearance level associated with each portion of the data request
4. Step 608 and/or 708: locating (and/or retrieving) at least one data element located in at least one external database, the at least one data element being associated with the data request
5. Step 610 and/or 710: parsing the at least one data element, the parsing comprising:
   a. determining an allowance of access to at least a portion of the at least one data element in accordance with (at least one of) the following:
      i. relevance to the data request
      ii. the verified security clearance level of the user
   b. (Alternate) Extracting at least a portion of the at least one data element in accordance with the following:
      i. relevance to the data request, and
      ii. the verified security clearance level,
   c. (Alternate) Redacting at least a portion of the at least one data element in accordance with (at least one of) the following:
      i. relevance to the data request
      ii. the verified security clearance level
      iii. an incongruence of the geolocation relating to the data request and the geolocation related to the at least one data element
      iv. a predetermined radius of the geolocation relating to the data request falling outside of a predetermined radius of the geolocation of the least one data element
6. Step 712: generating a token, the token being configured to allow access at least one data element, the token comprising a security layer in accordance with the parsing of the at least one data element
7. Step 612: (Alternate) generating a report, the report comprising:
    a. The parsed at least one data element
    b. a security layer
        i. a minimum security clearance requirement of the user
    c. an access permission and
    d. (curating and/or generating) a common operating picture
8. (Alternate) parsing visualizations of the report in accordance with the security level associated with a user of the user interface
9. Step 614 and/or 714: transmitting the token (and/or report) to the user device (and/or user).

Figure 3:
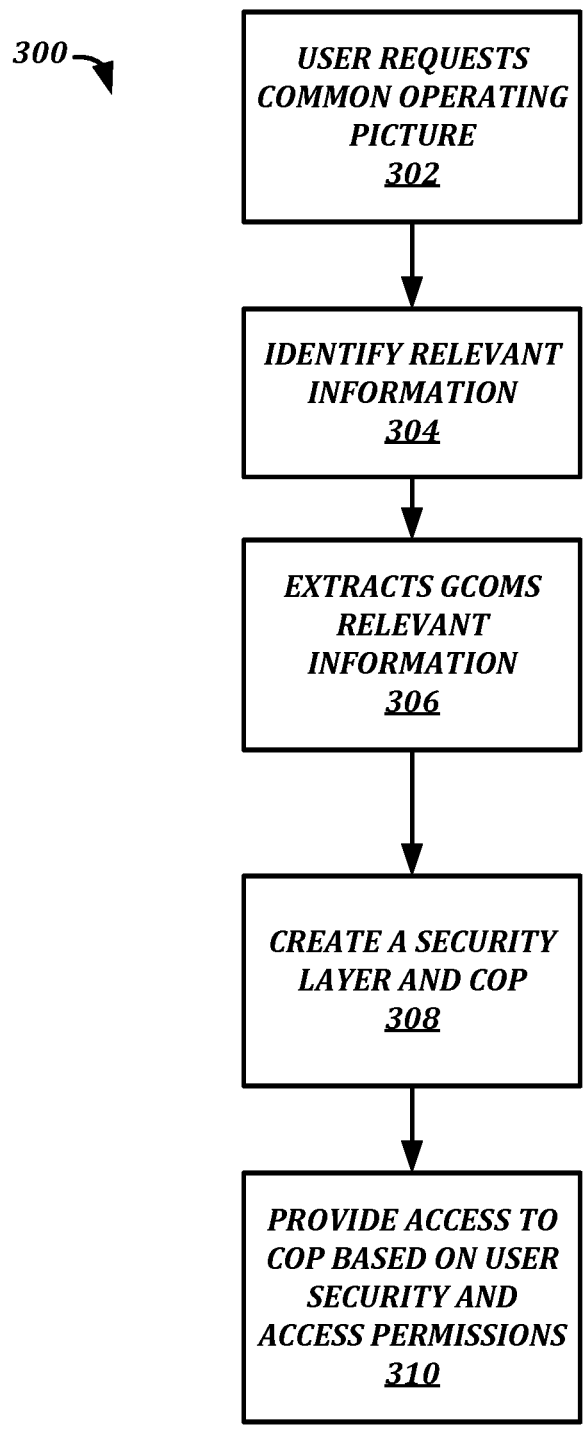
FIG. 3 illustrates a block diagram of an example of a method 300 of operation of the system 200 (of FIG. 2)
Figure 4:
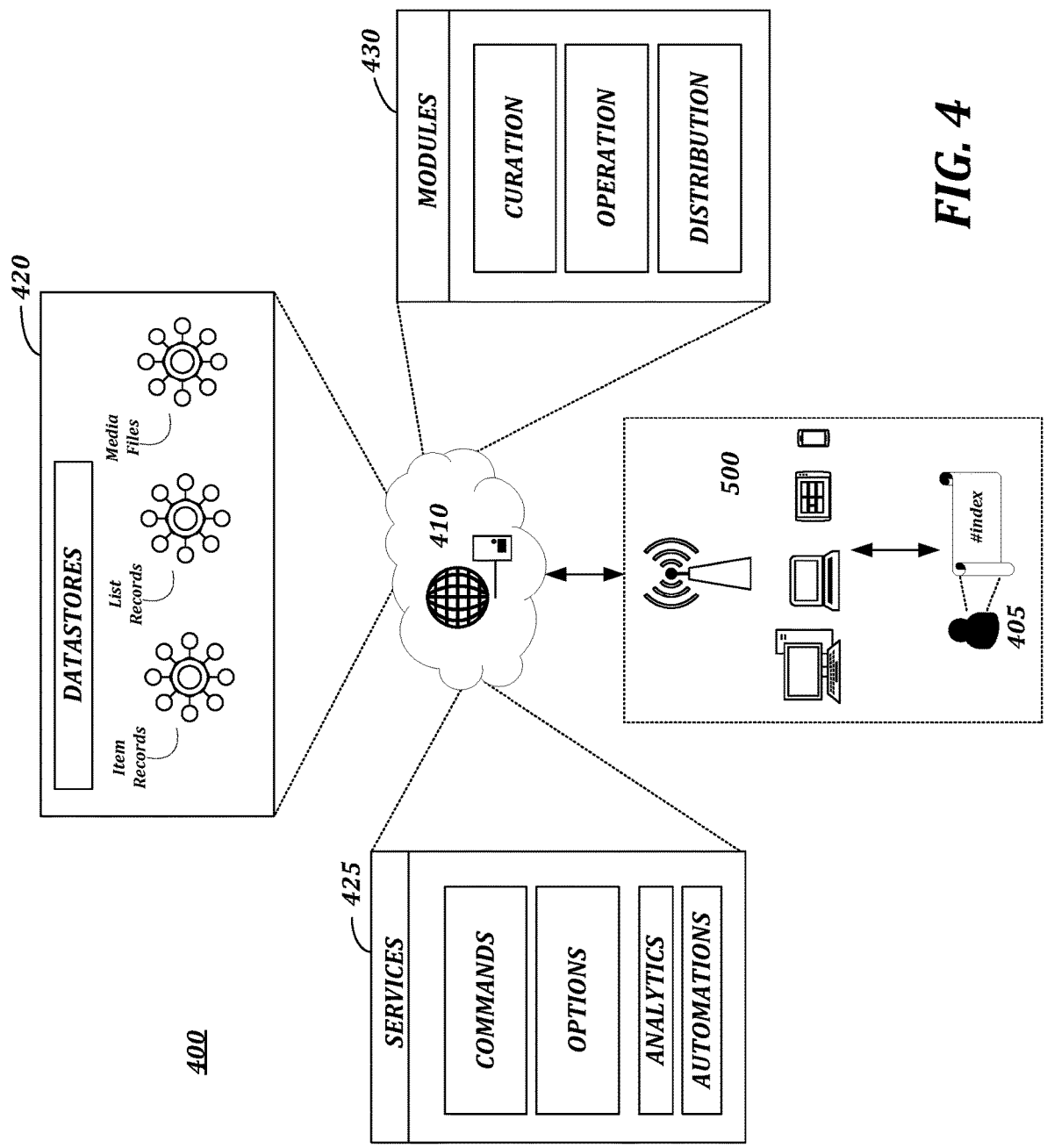
FIG. 4 illustrates a block diagram of an operating environment consistent with the present disclosure.

FIG. 3 illustrates a block diagram of an example of a method 300 of operation of the system 200 (of FIG. 2). In this regard, in block 302, the user may request a common operating picture. In block 304, the system may 200 identify relevant information. The relevant information may be identified by, for example, comparing the terms of the request with metadata tags or other similar data identification methods. In block 306, the identified GCOMS information is extracted from GCOMS 104. In block 308, a security layer and common operating picture are created. In block 310, the user is provided access to the common operating picture base on the security and access permissions of the user.

IV. Computing Device Architecture

Platform and/or System 400 and/or Platform and/or System 100 may be embodied as, for example, but not be limited to, a website, a web application, a desktop application, backend application, and a mobile application compatible with a computing device 500. The computing device 500 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS400/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device.

Platform 400 may be hosted on a centralized server or a cloud computing service. Although the methods have been described to be performed by a computing device 500, it should be understood that, in some embodiments, different operations may be performed by a plurality of the computing devices 500 in operative communication at least one network.

The platform 400 includes data stores 420 that are communicatively connected to a network 410. Services 425 and modules 430 are also connected to the network. A user 405 interacts with the system 400.

Embodiments of the present disclosure may comprise a system having a central processing unit (CPU) 520, a bus 530, a memory unit 540, a power supply unit (PSU) 550, and one or more Input/Output (I/O) units. The CPU 520 coupled to the memory unit 540 and the plurality of I/O units 560 via the bus 530, all of which are powered by the PSU 550. It should be understood that, in some embodiments, each disclosed unit may actually be a plurality of such units for the purposes of redundancy, high availability, and/or performance. The combination of the presently disclosed units is configured to perform the stages any method disclosed herein.

Figure 5:
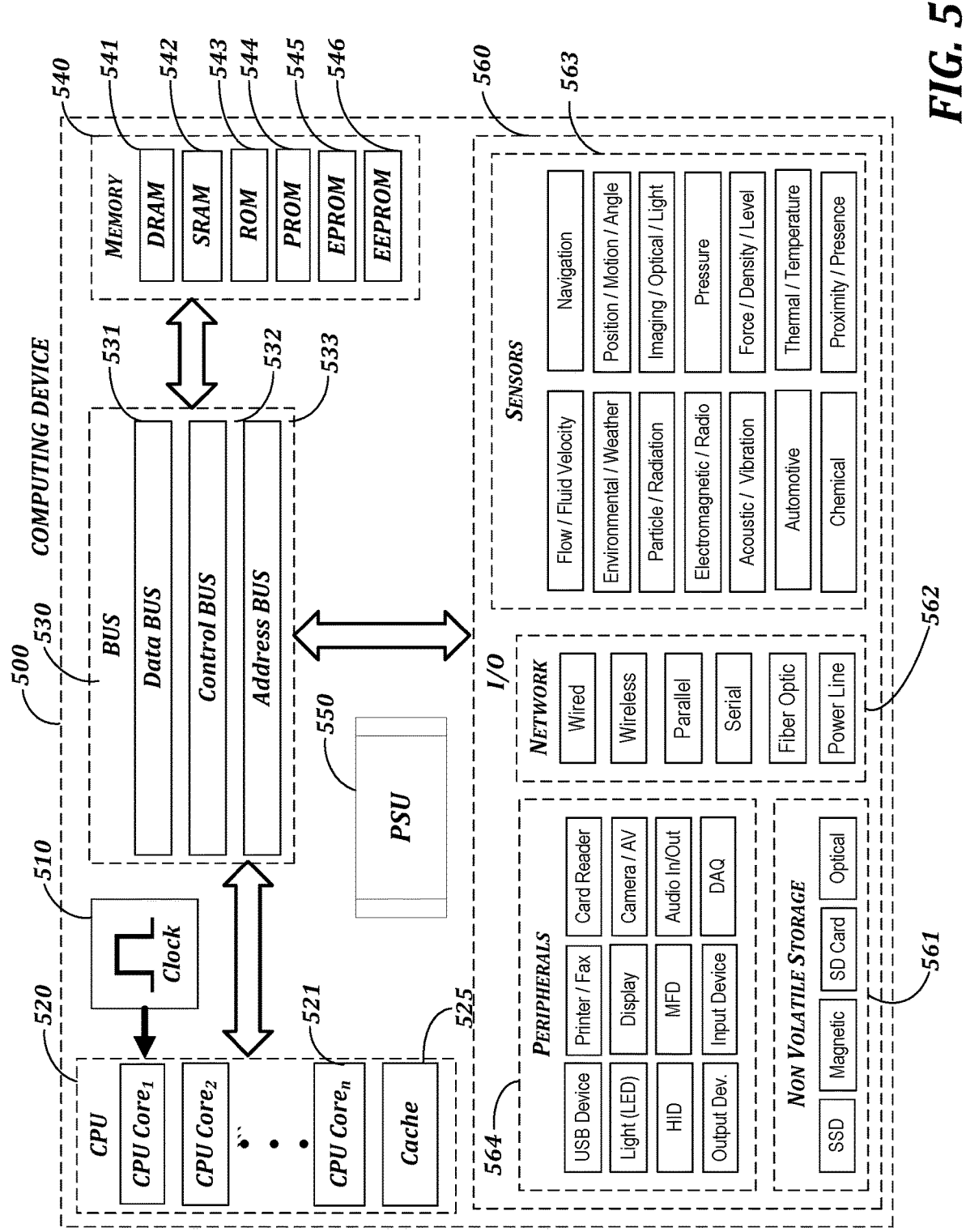
FIG. 5 is a block diagram of a system including a computing device for performing the method of FIG. 3.
Figure 6:
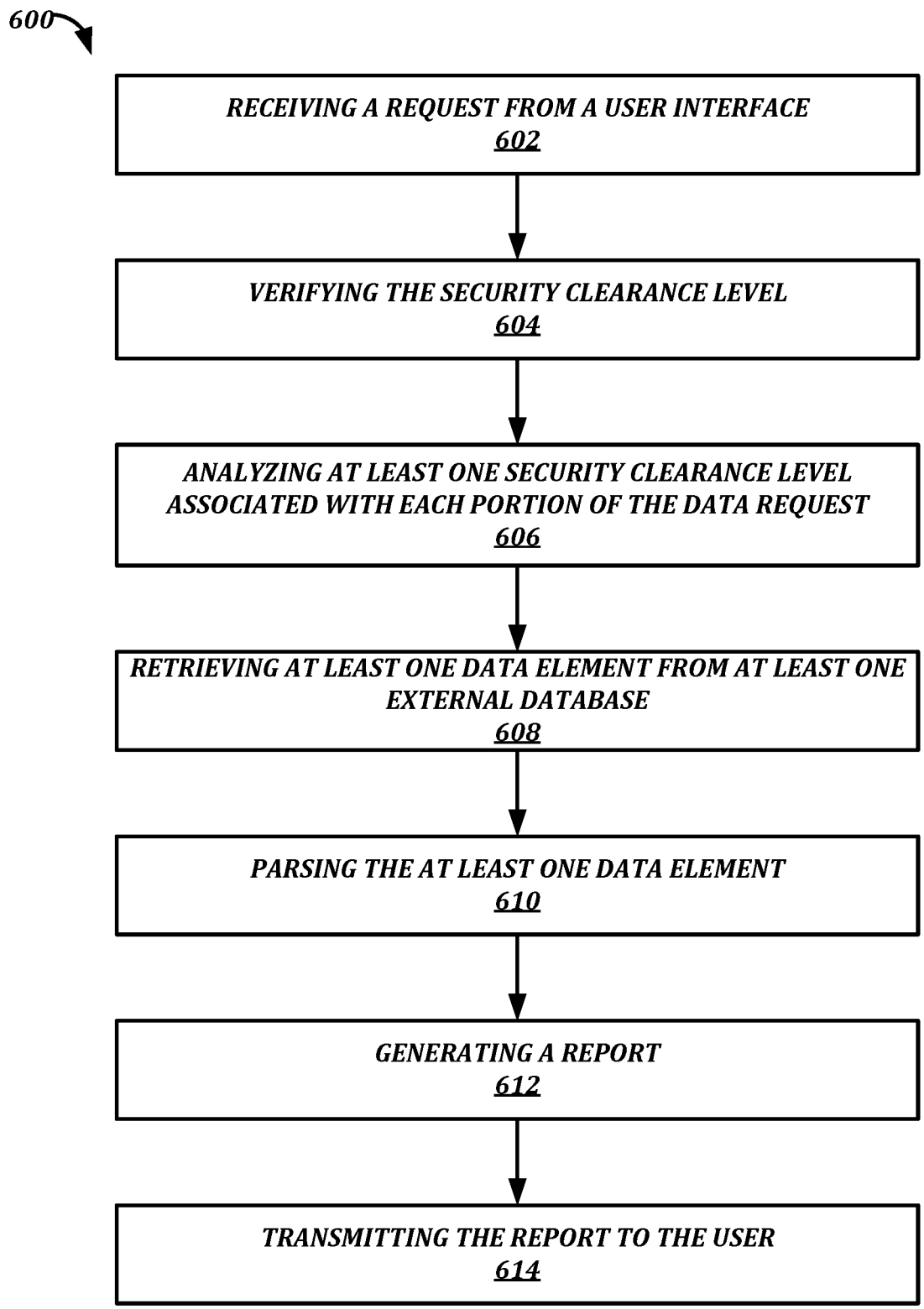
FIG. 6 illustrates a flow chart of a method consistent with the present disclosure.
Figure 7:
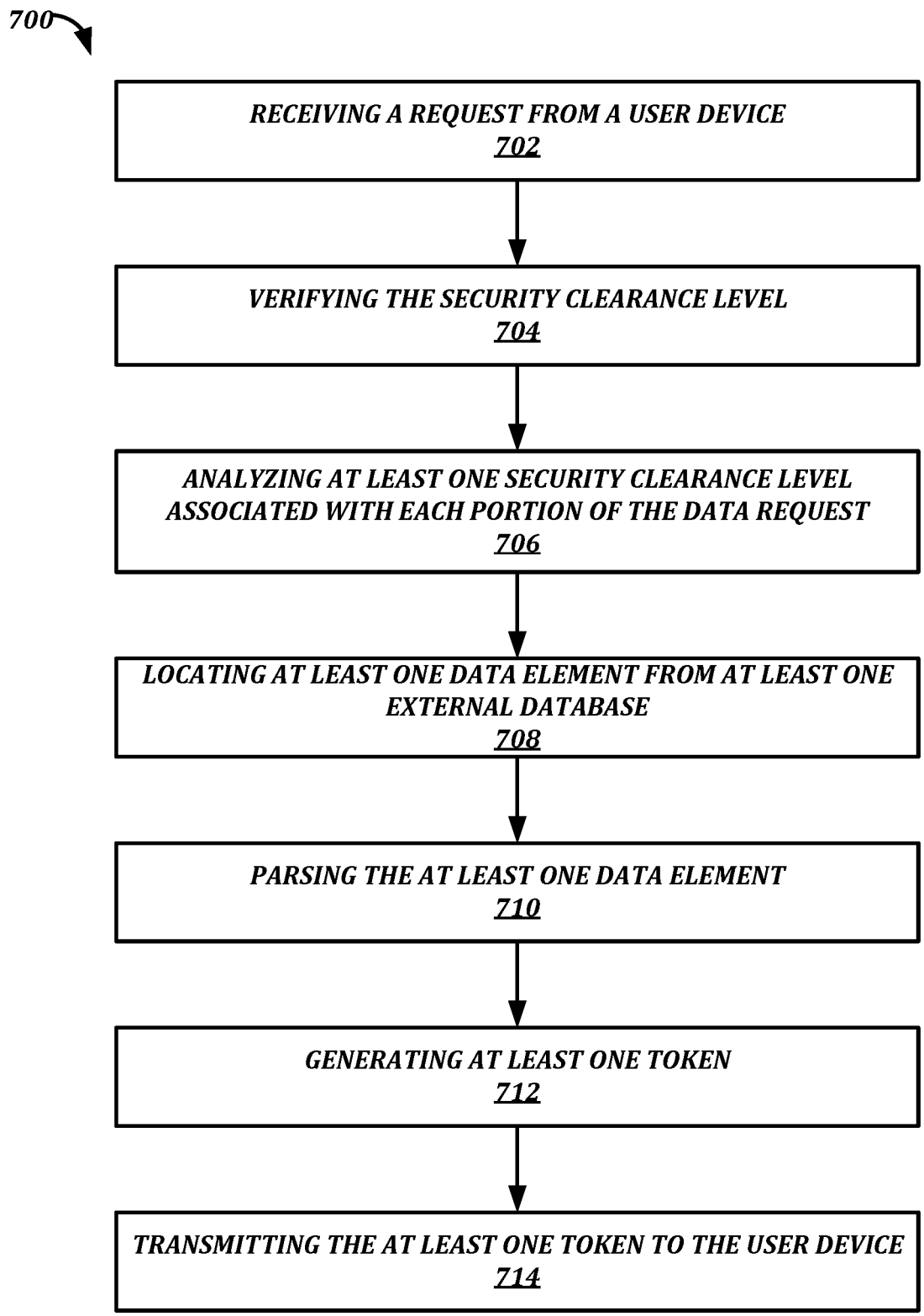
FIG. 7 illustrates a flow chart of a method consistent with the present disclosure.

FIG. 5 is a block diagram of a system including computing device 500. Consistent with an embodiment of the disclosure, the aforementioned CPU 520, the bus 530, the memory unit 540, a PSU 550, and the plurality of I/O units 560 may be implemented in a computing device, such as computing device 500 of FIG. 5. Any suitable combination of hardware, software, or firmware may be used to implement the aforementioned units. For example, the CPU 520, the bus 530, and the memory unit 540 may be implemented with computing device 500 or any of other computing devices 500, in combination with computing device 500. The aforementioned system, device, and components are examples and other systems, devices, and components may comprise the aforementioned CPU 520, the bus 530, the memory unit 540, consistent with embodiments of the disclosure.

At least one computing device 500 may be embodied as any of the computing elements illustrated in all of the attached figures. A computing device 500 does not need to be electronic, nor even have a CPU 520, nor bus 530, nor memory unit 540. The definition of the computing device 500 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 500, especially if the processing is purposeful.

With reference to FIG. 5, a system consistent with an embodiment of the disclosure may include a computing device, such as computing device 500. In a basic configuration, computing device 500 may include at least one clock module 510, at least one CPU 520, at least one bus 530, and at least one memory unit 540, at least one PSU 550, and at least one I/O 560 module, wherein I/O module may be comprised of, but not limited to a non-volatile storage sub-module 561, a communication sub-module 562, a sensors sub-module 563, and a peripherals sub-module 564.

A system consistent with an embodiment of the disclosure the computing device 500 may include the clock module 510 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 520, the central component of modern computers, which relies on a clock. The only exceptions are asynchronous circuits such as asynchronous CPUs. The clock 510 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 500 use a "clock multiplier" which multiplies a lower frequency external clock to the appropriate clock rate of the CPU 520. This allows the CPU 520 to operate at a much higher frequency than the rest of the computer, which affords performance gains in situations where the CPU 520 does not need to wait on an external factor (like memory 540 or input/output 560). Some embodiments of the clock 510 may include dynamic frequency change, where the time between clock edges can vary widely from one edge to the next and back again.

A system consistent with an embodiment of the disclosure the computing device 500 may include the CPU unit 520 comprising at least one CPU Core 521. A plurality of CPU cores 521 may comprise identical the CPU cores 521, such as, but not limited to, homogeneous multi-core systems. It is also possible for the plurality of CPU cores 521 to comprise different the CPU cores 521, such as, but not limited to, heterogeneous multi-core systems, big. LITTLE systems and some AMD accelerated processing units (APU). The CPU unit 520 reads and executes program instructions which may be used across many application domains, for example, but not limited to, general purpose computing, embedded computing, network computing, digital signal processing (DSP), and graphics processing (GPU). The CPU unit 520 may run multiple instructions on separate CPU cores 521 at the same time. The CPU unit 520 may be integrated into at least one of a single integrated circuit die and multiple dies in a single chip package. The single integrated circuit die and multiple dies in a single chip package may contain a plurality of other aspects of the computing device 500, for example, but not limited to, the clock 510, the CPU 520, the bus 530, the memory 540, and I/O 560.

The CPU unit 520 may contain cache 522 such as, but not limited to, a level 1 cache, level 2 cache, level 3 cache or combination thereof. The aforementioned cache 522 may or may not be shared amongst a plurality of CPU cores 521. The cache 522 sharing comprises at least one of message passing and inter-core communication methods may be used for the at least one CPU Core 521 to communicate with the cache 522. The inter-core communication methods may comprise, but not limited to, bus, ring, two-dimensional mesh, and crossbar. The aforementioned CPU unit 520 may employ symmetric multiprocessing (SMP) design.

The plurality of the aforementioned CPU cores 521 may comprise soft microprocessor cores on a single field programmable gate array (FPGA), such as semiconductor intellectual property cores (IP Core). The plurality of CPU cores 521 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 521, for example, but not limited to Instruction-level parallelism (ILP) such as, but not limited to, superscalar pipelining, and Thread-level parallelism (TLP).

Consistent with the embodiments of the present disclosure, the aforementioned computing device 500 may employ a communication system that transfers data between components inside the aforementioned computing device 500, and/or the plurality of computing devices 500. The aforementioned communication system will be known to a person having ordinary skill in the art as a bus 530. The bus 530 may embody internal and/or external plurality of hardware and software components, for example, but not limited to a wire, optical fiber, communication protocols, and any physical arrangement that provides the same logical function as a parallel electrical bus. The bus 530 may comprise at least one of, but not limited to a parallel bus, wherein the parallel bus carry data words in parallel on multiple wires, and a serial bus, wherein the serial bus carry data in bit-serial form. The bus 530 may embody a plurality of topologies, for example, but not limited to, a multidrop/electrical parallel topology, a daisy chain topology, and a connected by switched hubs, such as USB bus. The bus 530 may comprise a plurality of embodiments, for example, but not limited to:

Internal data bus (data bus) 531/Memory bus
Control bus 532
Address bus 533
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
Small Computer System Interface (SCSI)/Serial Attached SCSI (SAS)
HyperTransport
InfiniBand
RapidIO
Mobile Industry Processor Interface (MIPI)
Coherent Processor Interface (CAPI)
Plug-n-play
1-Wire
Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal 10, Thunderbolt/Mini DisplayPort, Mobile PCIe (M-PCIe), U.2, and Non-Volatile Memory Express (NVMe)/Non-Volatile Memory Host Controller Interface Specification (NVMHCIS).
Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).
Music Instrument Digital Interface (MIDI)
Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, and eXtensible Host Controller Interface (xHCI).

Consistent with the embodiments of the present disclosure, the aforementioned computing device 500 may employ hardware integrated circuits that store information for immediate use in the computing device 500, know to the person having ordinary skill in the art as primary storage or memory 540. The memory 540 operates at high speed, distinguishing it from the non-volatile storage sub-module 561, which may be referred to as secondary or tertiary storage, which provides slow-to-access information but offers higher capacities at lower cost. The contents contained in memory 540, may be transferred to secondary storage via techniques such as, but not limited to, virtual memory and swap. The memory 540 may be associated with addressable semiconductor memory, such as integrated circuits consisting of silicon-based transistors, used for example as primary storage but also other purposes in the computing device 500. The memory 540 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 541, Static Random-Access Memory (SRAM) 542, CPU Cache memory 525, Advanced Random-Access Memory (A-RAM), and other types of primary storage such as Random-Access Memory (RAM).

Non-volatile memory which can retain stored information even after power is removed, for example, but not limited to, Read-Only Memory (ROM) 543, Programmable ROM (PROM) 544, Erasable PROM (EPROM) 545, Electrically Erasable PROM (EEPROM) 546 (e.g., flash memory and Electrically Alterable PROM [EAPROM]), Mask ROM (MROM), One Time Programable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 500 may employ the communication system between an information processing system, such as the computing device 500, and the outside world, for example, but not limited to, human, environment, and another computing device 500. The aforementioned communication system will be known to a person having ordinary skill in the art as I/O 560. The I/O module 560 regulates a plurality of inputs and outputs with regard to the computing device 500, wherein the inputs are a plurality of signals and data received by the computing device 500, and the outputs are the plurality of signals and data sent from the computing device 500. The I/O module 560 interfaces a plurality of hardware, such as, but not limited to, non-volatile storage 561, communication devices 562, sensors 563, and peripherals 564. The plurality of hardware is used by the at least one of, but not limited to, human, environment, and another computing device 500 to communicate with the present computing device 500. The I/O module 560 may comprise a plurality of forms, for example, but not limited to channel I/O, port mapped I/O, asynchronous I/O, and Direct Memory Access (DMA).

Consistent with the embodiments of the present disclosure, the aforementioned computing device 500 may employ the non-volatile storage sub-module 561, which may be referred to by a person having ordinary skill in the art as one of secondary storage, external memory, tertiary storage, off-line storage, and auxiliary storage. The non-volatile storage sub-module 561 may not be accessed directly by the CPU 520 without using intermediate area in the memory 540. The non-volatile storage sub-module 561 does not lose data when power is removed and may be two orders of magnitude less costly than storage used in memory module, at the expense of speed and latency. The non-volatile storage sub-module 561 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (561) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (*UDO*)

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor Magnetic storage such as, but not limited to, Hard Disk Drive (HDD), tape drive, carousel memory, and Card Random-Access Memory (CRAM)

Phase-change memory

Holographic data storage such as Holographic Versatile Disk (HVD)

Molecular Memory

Deoxyribonucleic Acid (DNA) digital data storage

Consistent with the embodiments of the present disclosure, the aforementioned computing device 500 may employ the communication sub-module 562 as a subset of the I/O 560, which may be referred to by a person having ordinary skill in the art as at least one of, but not limited to, computer network, data network, and network. The network allows computing devices 500 to exchange data using connections, which may be known to a person having ordinary skill in the art as data links, between network nodes. The nodes comprise network computer devices 500 that originate, route, and terminate data. The nodes are identified by network addresses and can include a plurality of hosts consistent with the embodiments of a computing device 500. The aforementioned embodiments include, but not limited to personal computers, phones, servers, drones, and networking devices such as, but not limited to, hubs, switches, routers, modems, and firewalls.

Two nodes can be said are networked together, when one computing device 500 is able to exchange information with the other computing device 500, whether or not they have a direct connection with each other. The communication sub-module 562 supports a plurality of applications and services, such as, but not limited to World Wide Web (WWW), digital video and audio, shared use of application and storage computing devices 500, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 562 may comprise a plurality of size, topology, traffic control mechanism and organizational intent. The communication sub-module 562 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G,4G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line communications.

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 500 may employ the sensors sub-module 563 as a subset of the I/O 560. The sensors sub-module 563 comprises at least one of the devices, modules, and subsystems whose purpose is to detect events or changes in its environment and send the information to the computing device 500. Sensors are sensitive to the measured property, are not sensitive to any property not measured, but may be encountered in its application, and do not significantly influence the measured property. The sensors sub-module 563 may comprise a plurality of digital devices and analog devices, wherein if an analog device is used, an Analog to Digital (A-to-D) converter must be employed to interface the said device with the computing device 500. The sensors may be subject to a plurality of deviations that limit sensor accuracy. The sensors sub-module 563 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 500 may employ the peripherals sub-module 562 as a subset of the I/O 560. The peripheral sub-module 564 comprises ancillary devices uses to put information into and get information out of the computing device 500. There are 3 categories of devices comprising the peripheral sub-module 564, which exist based on their relationship with the computing device 500, input devices, output devices, and input/output devices. Input devices send at least one of data and instructions to the computing device 500. Input devices can be categorized based on, but not limited to:

Modality of input, such as, but not limited to, mechanical motion, audio, visual, and tactile Whether the input is discrete, such as but not limited to, pressing a key, or continuous such as, but not limited to position of a mouse The number of degrees of freedom involved, such as, but not limited to, two-dimensional mice vs three-dimensional mice used for Computer-Aided Design (CAD) applications Output devices provide output from the computing device 500. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 564:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 500. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 500 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data AcQuisition (DAQ) devices covert at least one of analog signals and physical parameters to digital values for processing by the computing device 500. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 562 sub-module), data storage device (non-volatile storage 561), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Aspects

The following disclose various Aspects of the present disclosure. The various Aspects are not to be construed as patent claims unless the language of the Aspect appears as a patent claim. The Aspects describe various non-limiting embodiments of the present disclosure.

Aspect 1. A data distribution system comprising:
  receiving a data request;
  processing the data request and identify data requested in the data request;
  extracting the identified data; and
  providing the identified data to a user.

Aspect 2. Developing a Common Operational Picture (in communication/association with the analytic product):
  Define Objectives,
  Map Solutions to Objectives,
  Identify the Requisite Intelligence,
  Establish the Data Requirements, and
  Implement the Appropriate Technology.

Aspect 3. A security module (in communication/association with the analytic product) may be used for at least one of the following:
  a. enforcing restrictions,
  b. removing and/or restricting users,
  c. restricting and/or Removing content,
  d. resetting and/or changing user passwords,
  e. limiting and/or removing personal user data, and/or
  f. restricting communication and/or profile access of the first user to the second user.

Aspect 4. Tracking Module. (In some embodiments, part of the common operating picture and/or any other component of the system) (in communication/association with the analytic product)

In some embodiments, a tracking module may be configured to track, store, and/or relay geolocation information of the user, mobile device of the user, and/or an object of interest. In further embodiments, the tracking module may track, store, and/or relay gyroscopic information of the user and/or mobile device of the user. In yet further embodiments, the tracking module may track, store, and/or relay proximity information of the mobile device of the user and at least one other electronic device. In some embodiments, the geolocation data, gyroscopic information, and/or proximity information may be recorded in a predetermined time increment.

VI. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A system comprising:
  a processor connected to a user device; a memory on which are stored machine-readable instructions that when executed by the processor, cause the processor to:
  receive a request from a user device interface, the user device interface operative to receive an input from a user, the input comprising the following:
  a data request associated with a common operating picture, and a security clearance level associated with the data request;
  verify the security clearance level;
  analyze the security clearance level for each portion of the data request; generate at least one token based on the security clearance level, wherein the at least one token comprising:
  a unique access code,
  an identifier,
  a permission indicator,
  a portal,
  an operator,
  and a string;
  retrieve at least one data element from at least one external database, the at least one data element being associated with the data request;

compare a geolocation relating to the data request and a geolocation related to the at least one data element;

parse the at least one data element by extracting at least a portion of the at least one data element in accordance with the at least one token;

redact at least a portion of the parsed at least one data element in accordance with the following: relevance to the data request, and the verified security clearance level;

generate a report, the report comprising:
the redacted at least one data element,
a security layer defined as a minimum-security clearance requirement of the user,
the security layer generated in accordance with the parsing of the at least one data element,
and the common operating picture comprising the redacted at least one data element;
and transmit the report to the user.

2. The system of claim 1, further comprising machine-readable instructions that when executed by the processor, cause the processor to: retrieve the at least one data element from at least one of the following: a global collection operations system management system, and a global command and control system.

3. The system of claim 2, wherein generating the report further comprises generating the security layer, the security layer comprising at least one access permission.

4. The system of claim 2, wherein generating the report further comprises generating the common operating picture, the common operating picture comprising an identical display of relevant strategic information available to a plurality of users.

5. The system of claim 2, further comprising machine-readable instructions that when executed by the processor, cause the processor to receive the security clearance level, the security clearance level comprising a plurality of hierarchical classification levels.

6. The system of claim 2, further comprising machine-readable instructions that when executed by the processor, cause the processor to curate the common operating picture in accordance with the following: the redacted at least one data element, and the security layer.

7. The system of claim 2, further comprising machine-readable instructions that when executed by the processor, cause the processor to parse visualizations of the report in accordance with a security clearance level associated with the user.

8. The system of claim 1, further comprising machine-readable instructions that when executed by the processor, cause the processor to redact at least a portion of the at least one data element in accordance with an incongruence of the geolocation relating to the data request and the geolocation related to the at least one data element.

9. The system of claim 1, further comprising machine-readable instructions that when executed by the processor, cause the processor to redact at least a portion of the at least one data element in accordance with a predetermined radius of the geolocation relating to the data request falling outside of a predetermined radius of the geolocation of the at least one data element.

\* \* \* \* \*